(12) United States Patent
Wang et al.

(10) Patent No.: US 9,408,075 B2
(45) Date of Patent: Aug. 2, 2016

(54) SYSTEMS, METHODS, AND COMPUTER PROGRAM PRODUCTS FOR PROCESSING A REQUEST RELATING TO A MOBILE COMMUNICATION DEVICE

(71) Applicant: GOOGLE INC., Mountain View, CA (US)

(72) Inventors: Wei Wang, Frisco, TX (US); Kevin S. Cnare, Lewisville, TX (US); Patrick M. Platt, Jr., Atlanta, GA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/305,225

(22) Filed: Jun. 16, 2014

(65) Prior Publication Data

US 2014/0370851 A1  Dec. 18, 2014

Related U.S. Application Data

(60) Provisional application No. 61/835,974, filed on Jun. 17, 2013, provisional application No. 61/845,094, filed on Jul. 11, 2013.

(51) Int. Cl.
*H04W 12/06* (2009.01)
*G06Q 20/32* (2012.01)
*H04L 29/06* (2006.01)
(Continued)

(52) U.S. Cl.
CPC ............ *H04W 12/06* (2013.01); *H04L 63/101* (2013.01); *H04W 12/08* (2013.01); *G06Q 30/00* (2013.01)

(58) Field of Classification Search
None
See application file for complete search history.

(56) References Cited

U.S. PATENT DOCUMENTS 5,590,038 A   12/1996   Pitroda ......................... 395/241
5,640,002 A   6/1997   Ruppert et al. ............... 235/472
(Continued)

FOREIGN PATENT DOCUMENTS

CA   2 381 614 A1   3/2001
EP   1 222 503 A2   7/2002
(Continued)

OTHER PUBLICATIONS

Int'l Search Report and Written Opinion issued in connection with Int'l Appl'n No. PCT/US2014/042469 on Oct. 13, 2014 (9 pages).
(Continued)

*Primary Examiner* — Daniel Lai
(74) *Attorney, Agent, or Firm* — Johnson, Marcou & Isaacs, LLC

(57) ABSTRACT

Systems, methods, and computer program products are provided for processing a request relating to a mobile device. A request, including a mobile device identifier and a partner system identifier corresponding to the partner system, is received from a partner system via a communication network. An authorization procedure is executed based on the mobile device identifier and the partner system identifier. The authorization procedure includes determining whether a partner system account list, associated with the mobile device identifier, includes the partner system identifier. Authorization of the request is granted if the partner system account list includes the partner system identifier; and is denied if the partner system account list does not include the partner system identifier. A response to the request is transmitted to the partner system via the communication network, based on a result of the authorization procedure.

15 Claims, 19 Drawing Sheets

(51) Int. Cl.
*H04W 12/08* (2009.01)
*G06Q 30/00* (2012.01)

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| 8,571,937 B2* | 10/2013 | Rose | G06Q 20/12 340/506 |
| 8,577,804 B1* | 11/2013 | Bacastow | G06Q 20/027 235/380 |
| 2002/0002533 A1* | 1/2002 | Singhal | G06Q 20/02 705/39 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0287004 A1 | 12/2006 | Fuqua | 455/558 |
| 2007/0014407 A1 | 1/2007 | Narenda et al. | 380/259 |
| 2007/0014408 A1 | 1/2007 | Narenda et al. | 380/270 |
| 2007/0198432 A1 | 8/2007 | Pitroda et al. | 705/64 |
| 2007/0198438 A1 | 8/2007 | Bentley et al. | 705/80 |
| 2008/0306849 A1 | 12/2008 | Johnson, Jr. et al. | 705/35 |
| 2009/0108064 A1 | 4/2009 | Fernandes et al. | 235/380 |
| 2009/0164322 A1 | 6/2009 | Khan et al. | 705/14 |
| 2010/0130164 A1 | 5/2010 | Chowdhury et al. | 455/410 |
| 2010/0131415 A1* | 5/2010 | Sartipi | G06Q 20/02 705/75 |
| 2010/0241494 A1 | 9/2010 | Kumar et al. | 705/14.1 |
| 2010/0291904 A1 | 11/2010 | Musfeldt et al. | 455/414.1 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0101951 A1 | 4/2012 | Li et al. | 705/71 |
| 2012/0109764 A1 | 5/2012 | Martin et al. | 705/17 |
| 2012/0323664 A1 | 12/2012 | Klems | 705/14.26 |
| 2012/0330764 A1* | 12/2012 | Nahidipour | G06Q 20/3278 705/17 |
| 2013/0238455 A1* | 9/2013 | Laracey | G06Q 20/108 705/21 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| KR | 10-2011-0062620 A | 6/2011 |
| WO | WO 01/18629 A3 | 3/2001 |
| WO | WO 03/012717 A1 | 2/2003 |
| WO | 2014/204832 A1 | 12/2014 |

OTHER PUBLICATIONS

Baharlou, "International Preliminary Report on Patentability issued in International Application No. PCT/US2014/042469", mailed on Dec. 30, 2015, 6 pages.

\* cited by examiner

SYSTEMS, METHODS, AND COMPUTER PROGRAM PRODUCTS FOR PROCESSING A REQUEST RELATING TO A MOBILE COMMUNICATION DEVICE

CROSS-REFERENCE TO RELATED APPLICATIONS

The present application claims priority to U.S. Provisional Application Nos. 61/835,974, filed on Jun. 17, 2013, and 61/845,094, filed on Jul. 11, 2013. The entire contents of these applications are hereby incorporated by reference herein.

BACKGROUND

1. Field

Example aspects described herein relate generally to mobile communication devices, and more particularly to systems, methods, and computer program products for processing requests relating to mobile communication devices.

2. Related Art

Mobile communication devices (also referred to herein as mobile devices) are becoming more and more versatile, and are being used in an increasing number of ways to make various everyday tasks simpler and/or more efficient. For example, mobile devices are being made to include mobile applications, such as mobile wallets, which may be used to conduct financial transactions (e.g., payments) and/or non-financial transactions (e.g., venue admissions), without the need for physical cash, checks, credit cards, tickets, and/or the like.

In order to enable consumer care systems and/or agents to provide consumer care to mobile device users, e.g., when issues arise relating to mobile devices and/or mobile applications stored thereon, it would be beneficial to provide the consumer care systems and/or agents with access to information relating to mobile devices or applications, and/or enable the agents to perform various operations relating to mobile devices or applications. However, because information relating to mobile devices or applications can be sensitive or confidential, access to such information and to operations relating to mobile devices or applications must be restricted for security and privacy reasons.

Given the foregoing, it would be beneficial to safeguard information relating to mobile communication devices and restrict access to operations relating to mobile communication devices, while also providing consumer care systems and/or agents with a level of access to such information and/or operations that is sufficient for consumer care purposes.

One technical challenge in doing so lies in the processing of mobile communication device information and/or operation requests that are received from different entities (e.g., a mobile wallet provider, external partners, such as payment product issuers (also referred to herein as "issuers") and/or mobile network operators (MNOs), and/or the like) and/or personnel that may provide consumer care in connection with mobile communication devices. Moreover, different levels of access may be appropriate for specific levels of personnel (e.g., consumer care agents) within a particular entity.

SUMMARY

The example embodiments herein provide systems, methods, and computer program products for processing a request relating to a mobile communication device. The request, in some example embodiments herein, may relate to a mobile application, such as a mobile wallet, stored on the mobile communication device.

In accordance with one example aspect herein, a request, including a mobile device identifier and a partner system identifier corresponding to the partner system, is received from a partner system via a communication network. An authorization procedure is executed based on the mobile device identifier and the partner system identifier. The authorization procedure includes determining whether a partner system account list, associated with the mobile device identifier, includes the partner system identifier. Authorization of the request is granted if the partner system account list includes the partner system identifier; and is denied if the partner system account list does not include the partner system identifier. A response to the request is transmitted to the partner system via the communication network, based on a result of the authorization procedure.

In another example embodiment, the step of receiving the request includes receiving the request from the partner system by way of a portal and a gateway, and the method further comprises steps of: (1) authenticating the partner system at the gateway; and (2) appending the partner system identifier to the request at the gateway.

In one example herein, the request further includes an agent identifier, and the portal includes a graphical user interface (GUI) that enables the partner system to generate a predetermined set of requests based on a predetermined access level associated with the partner system and the agent identifier.

In accordance with some example aspects herein, the request is a request for consumer data relating to a mobile wallet associated with the mobile device identifier, the consumer data including any one or a combination of: (1) a consumer profile, (2) wallet information, (3) wallet event history, (4) service account information, (5) service account history, and (6) service account event status.

If the authorization of the request is granted, in one example, the method further comprises steps of: (1) retrieving the consumer data from a wallet server; and (2) including the consumer data in the response.

In another example herein, the request is a request for performance of an operation relating to a mobile wallet associated with the mobile device identifier, and the operation includes any one or a combination of: (1) updating a service account state, (2) updating a mobile wallet state, (3) resetting a password, and (4) resetting a security question and answer.

If the authorization of the request is granted, the method further comprises a step of performing the operation by transmitting one or more commands to the mobile wallet, in accordance with another example herein.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

The terms "payment product" and "card" may be used interchangeably herein to refer to a product, such as a credit card, a general purpose reloadable (GPR) card, and/or the like, that may be used to conduct financial transactions.

The term "service provider data" as used herein generally refers to data relating to one or more service providers, service provider systems, and/or services provided by one or more service providers. In some example embodiments herein, service provider data refers to any data associated with a service provider that is stored in a wallet database and/or in a wallet client database.

The term "wallet instance" as used herein generally refers to one instance of a wallet, mobile wallet, and/or mobile wallet application that is deployed and/or stored on a mobile device.

Presented herein are novel and inventive systems, methods, and computer program products for processing a request relating to a mobile communication device. The request, in some examples herein, may relate to a mobile application, such as a mobile wallet (which may also be referred to as a "mobile wallet client" or a "wallet client"), stored on the mobile communication device. In accordance with some aspects described herein, systems, methods, and computer program products are provided that enable the safeguarding of information relating to mobile communication devices and the restriction of access to operations relating to mobile communication devices, while also providing consumer care systems and/or agents with a level of access to such information and/or operations that is sufficient for consumer care purposes.

Some example aspects described herein facilitate the processing of mobile wallet information and/or operation requests that are received from systems managed by different entities (e.g., a mobile wallet provider, external partners, such as payment product issuers and/or mobile network operators (MNOs), and/or the like) and/or personnel managing those systems who may provide consumer care in connection with mobile wallets. Different levels of access may be provided for specific levels of personnel (e.g., consumer care agents) within a particular entity, in accordance with some example aspects herein.

II. System

Figure 1:
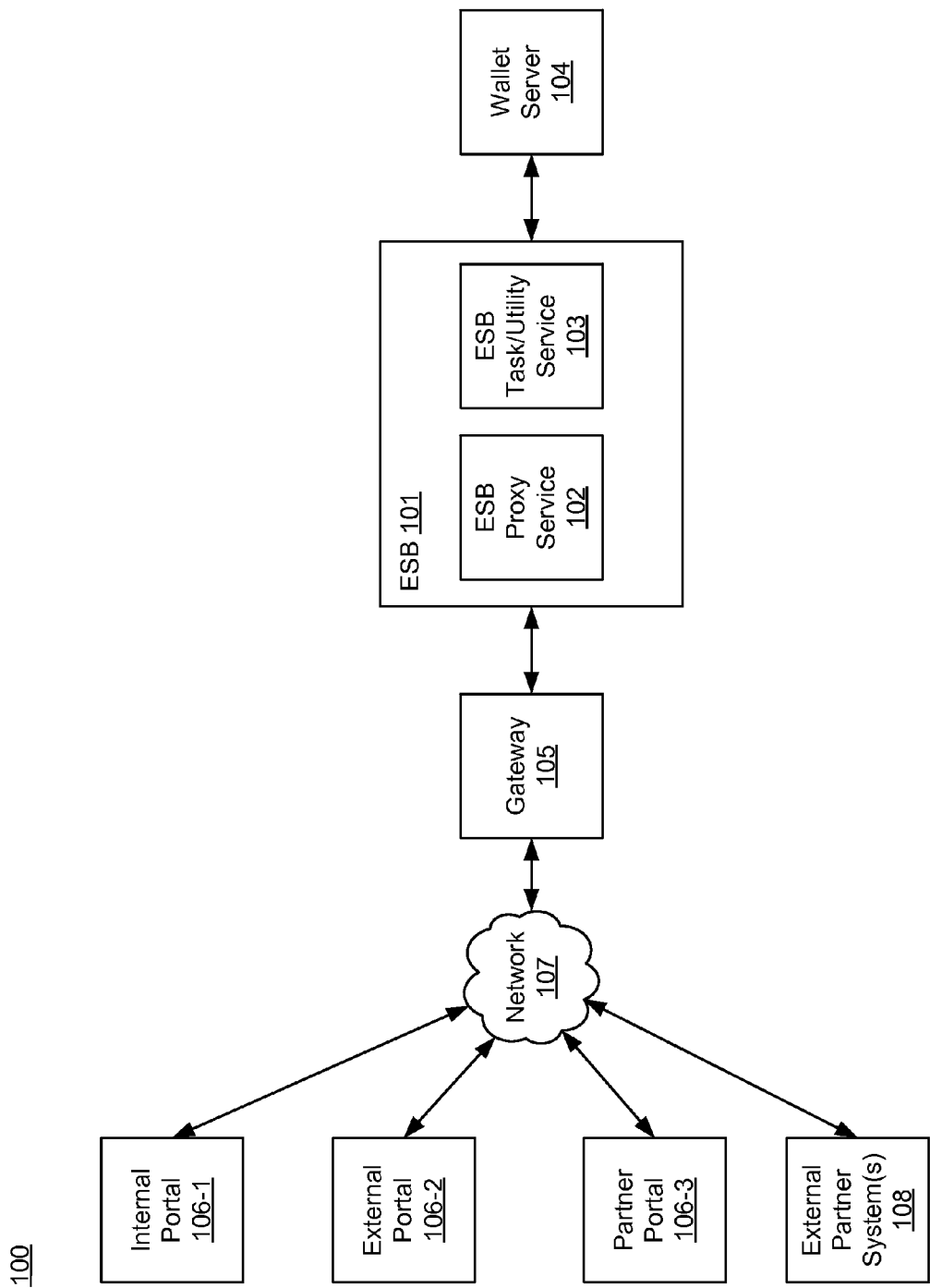
FIG. 1 is a diagram of an example system for processing a request relating to a mobile device, in accordance with various example embodiments herein.

FIG. 1 is a diagram of an example system 100 for processing a request relating to a mobile device, in accordance with various example aspects herein. The system 100 includes an enterprise service bus (ESB) 101, a wallet server 104 (which may also be referred to as a "mobile wallet server" or a "server"), a gateway 105, portals 106-1, 106-2, and 106-3 (individually and/or collectively referenced as "106"), a network 107, and one or more external partner system(s) 108.

The ESB 101 is communicatively coupled to the wallet server 104 by any suitable communication channel. In some example embodiments, the ESB 101 is communicatively coupled to the wallet server 104 by way of a direct connection, a proprietary network, a private network, a virtual private network (VPN), a network employing Hypertext Transfer Protocol (HTTP) standards, the Internet, and/or another type of network. The ESB 101, in another example, is communicatively coupled to the wallet server 104 via a secured communication channel.

The gateway 105 communicatively couples the ESB 101 to the one or more portal(s) 106 and to the external partner system(s) 108 by way of the network 107. The network 107 may be a mobile phone cellular network, a radio network, a proprietary network, a private network, a VPN, a network employing HTTP standards, the Internet, and/or another type of network.

The portals 106 are systems including interfaces, such as graphical user interfaces (GUIs), that enable a system and/or user (e.g., a consumer care agent of an entity (e.g., an MNO, an issuer, or another entity) associated with a mobile wallet account) to log into a partner care account and generate certain requests relating to mobile wallet accounts associated with the entity. In one example embodiment, the GUI of each portal 106 enables the corresponding partner system to generate a predetermined set of requests based on a predetermined access level associated with the particular partner system and an agent identifier that uniquely identifies the user logged into the GUI of the portal 106. The requests that can be generated by way of the portals 106 include (1) requests for information stored in the wallet server 104 and associated with mobile wallets, and/or (2) requests for execution of operations relating to such mobile wallets.

In one example embodiment herein, the wallet server 104 stores numerous types of information relating to each of a plurality of mobile wallet accounts provided by a mobile wallet provider. For instance, the wallet server 104 stores, for each mobile wallet account, (1) a consumer profile, (2) wallet information, (3) wallet event history, (4) service account information, (5) service account history, and (6) service account event status. Although not shown in FIG. 1 for purposes of convenience, in some example embodiments the wallet server 104 may include, or be communicatively coupled to, a wallet database that stores information on behalf of the wallet server 104.

The wallet server 104 also is configured to execute numerous types of operations relating to mobile wallet accounts. For instance, the wallet server 104 is configured to execute, for each mobile wallet account, (1) an update of a service account state, (2) an update of a mobile wallet state, (3) a reset of a password, and (4) a reset of a security question and answer.

As will be described in further detail below, in accordance with various example aspects herein, the ESB 101 acts as an intermediary between the portals 106 and the wallet server 104. In one example embodiment herein, the ESB 101 represents a central ESB managed by a mobile wallet provider. In particular, the ESB 101 processes requests received from the one or more portals 106 relating to mobile wallets that have information stored in the wallet server 104, and orchestrates procedures among such systems, for example, to provide integrated access to information and/or operations relating to such mobile wallets. In some example embodiments, the system 100 does not include the ESB 101 and the functions implemented by the ESB 101 are implemented by the wallet server 104 instead, or by any other interconnected system (e.g., a trusted service manager) programmed to execute such functionality.

As shown in FIG. 1, the ESB 101 includes an ESB proxy service 102 and an ESB task/utility service 103 (which may also be referred to herein as an "ESB task service"). The ESB proxy service 102 acts as an intermediary for requests received, by way of the network 107 and the gateway 105, from external systems (e.g., the portals 106 and/or the external partner system(s) 108) seeking resources (e.g., mobile-wallet-related information and/or operations) from the wallet server 104.

As described in further detail below, upon receiving such a request, the gateway 105 executes an authentication procedure to authenticate the system from which the request originated (e.g., the portals 106 or the external partner system 108, also referred to herein as the "requestor" or the "requesting system"). In some example aspects herein, after authenticating the requesting system, the gateway 105 appends and/or adds to the request a partner system identifier that uniquely identifies the entity with which the requesting system is associated. After the requestor has been authenticated, the gateway 105 forwards the request to the ESB proxy service 102.

Upon receiving the request from the gateway 105, the ESB proxy service 102 cooperates with the ESB task service 103 to execute an authorization procedure for the request and/or further process the request. In particular, the proxy service 102 forwards the request, and/or instructions that the proxy service 102 prepares based on the request, to the ESB task service 103 for further processing. Upon receiving a request and/or other instructions from the proxy service 102, the ESB task service 103 executes one or more tasks (e.g., an authorization procedure, the retrieval and transmission of mobile-wallet-related information from the wallet server 104 to the partner system, the execution of a mobile-wallet-related operation) based on the request and/or the other instructions.

In some example embodiments, the external partner system(s) 108 are systems owned, operated, maintained, and/or provided by external partners (e.g., service providers, MNOs, payment product issuers, and/or the like) with which the ESB 101 interacts to execute operations (e.g., suspension of a mobile wallet account, and/or the like) requested by a partner system relating to one or more mobile wallet accounts associated with the partner system.

III. Procedure

Figure 2:
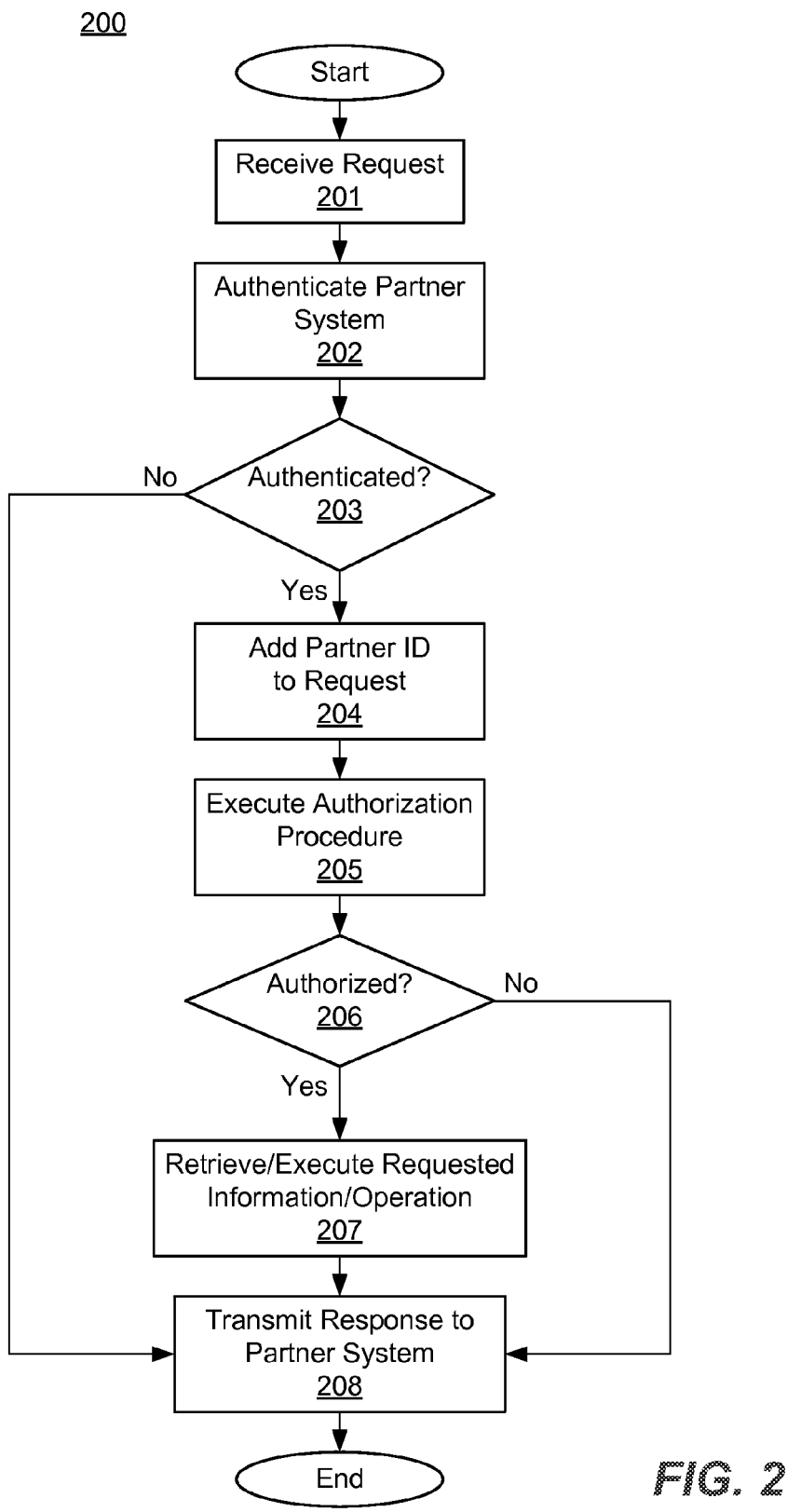
FIG. 2 shows an example procedure for processing a request relating to a mobile device, in accordance with an example embodiment herein.

Having described an example system 100 for processing a request relating to a mobile device, reference will now be made to FIG. 2 to describe an example procedure 200 for processing a request relating to a mobile device, in accordance with an example embodiment herein.

At step 201, the gateway 105 receives, from one of the portals 106 associated with a corresponding partner system by way of the network 107, a request relating to a mobile device. As described in further detail below, depending on the type of request, the request may include various types of data elements. In one example embodiment, the request includes a mobile device identifier and a partner system identifier corresponding to the partner system.

In another example embodiment, the request also includes an agent identifier identifying the user (e.g., a consumer agent) of the partner system and/or identifying a predetermined access level associated with the portal 106, the corresponding partner system, and/or the user. The portal 106 includes a graphical user interface (GUI) that enables the user to generate a predetermined set of requests based on a predetermined access level associated with the partner system and the agent identifier.

The request may be for consumer data relating to a mobile wallet associated with the mobile device identifier, and the consumer data may include any one or a combination of: (1) a consumer profile, (2) wallet information, (3) wallet event history, (4) service account information, (5) service account history, and (6) service account event status.

The request may also or alternatively be for performance of an operation relating to a mobile wallet associated with the mobile device identifier. The operation may include any one or a combination of: (1) updating a service account state, (2) updating a mobile wallet state, (3) resetting a password, and (4) resetting a security question and answer.

At step 202, the gateway 105 executes an authentication procedure (e.g., in a known manner by employing standard HTTP authentication certificates and/or a secure sockets layer (SSL) protocol) to authenticate the partner system associated with the portal 106.

At step 203, a determination is made as to whether the partner system associated with the portal 106 was successfully authenticated by the authentication procedure executed at step 202. If the partner system associated with the portal 106 is not successfully authenticated by the authentication procedure executed at step 202 ("No" at step 203), then control passes to step 208 (described below) to transmit a response to the portal 106 indicating that the corresponding partner system was not successfully authenticated.

If, on the other hand, the partner system associated with the portal 106 is successfully authenticated by the authentication procedure executed at step 202 ("Yes" at step 203), then control passes to step 204. At step 204, the gateway 105 appends and/or adds to the request a partner system identifier that uniquely identifies the partner system from which the request originated. The gateway 105 then forwards the request to the ESB 101 for further processing.

At step 205, the ESB 101 executes an authorization procedure based on the mobile device identifier and the partner system identifier. Example authentication procedures that may be executed at step 205 are described in further detail below in connection with FIGS. 3 and 11. In general, however, the step of executing the authorization procedure may include steps of: (1) determining whether a partner system account list, associated with the mobile device identifier, includes the partner system identifier; (2) granting authorization of the request, if the partner system account list includes the partner system identifier; and (3) denying authorization of the request, if the partner system account list does not include the partner system identifier.

At step 206, a determination is made as to whether authorization of the request has been granted at step 205. If authorization of the request has not been granted at step 205 ("No" at step 206), then control passes to step 208 (described below) to transmit a response to the portal 106 indicating that the request has not been authorized.

If, on the other hand, authorization of the request has been granted at step 205 ("Yes" at step 206), then control passes to step 207. At step 207, the ESB 101 and/or the wallet server 104 cooperate to fulfill the request by (1) retrieving the requested information from the wallet server 104 and/or (2) executing the requested operation (e.g., by transmitting one or more commands to a corresponding mobile wallet). At step 208, the ESB 101 transmits, to the portal 106 via the communication network, a response to the request (e.g., including the requested information and/or indicating whether or not the requested operation has been executed successfully).

A. Overview of Requests

As discussed above, various types of requests may be received by the ESB 101 from the portals 106 by way of the network 107 and the gateway 105. Various aspects of such requests will be described in further detail below. In general, the request may be a request for consumer data relating to a mobile device associated with a mobile wallet identifier included in the request. Alternatively, the request may be a request for performance of an operation relating to the mobile wallet associated with the mobile device identifier included in the request.

Depending on the type of request and/or on the type of entity from which the request originates, the request may include different types of messages, data elements, and/or may be communicated via different data flows. As described below in further detail, in one example embodiment, different types of messages, data elements, and data flows are employed for requests that originate from portals 106 associated with MNOs than for requests that originate from portals 106 associated with issuers.

B. Mobile Network Operators

Reference will now be made to FIGS. 3 through 10 to describe various aspects of messages, data elements, and/or data flows that may be employed in connection with requests that originate from a portal 106 associated with an MNO, in accordance with various example embodiments herein.

1. Message Structure

In one example, a request that originates from a portal 106 associated with an MNO includes three components: a message header, a customer proprietary network information (CPNI) header, and a message body. An example set of data elements that may be included in the message header are described below in Table 1.

TABLE 1

| Element | Description | Required | Multi-plicity | Data Type |
|---|---|---|---|---|
| Reference ID | A unique message identifier (UUID) for each message generated by the calling client. Used for tracking purposes. Same reference ID will be provided back to the synchronous response and also asynchronous call back response. | Optional | 1 | String (256) |
| Transaction ID | This is a unique message identifier (UUID) for each message generated in ESB Layer. Also called GUID in Oracle ESB terms. | Optional | 1 | String (256) |
| Originator ID (also referred to as a "partner system identifier") | Originator who creates message; in some cases may be appended/added to request by gateway 105. | Optional | 1 | String (32) |
| DateTime Stamp | Date and time when the message is invoked. Provided by calling client. | Optional | 1 | DateTime |

An example set of data elements that may be included in the CPNI header are described below in Table 2.

TABLE 2

| Element | Description | Required | Multi-plicity | Data Type |
|---|---|---|---|---|
| Agent ID | The ID for the agent who creates the request. | Optional | 1 | String (32) |
| Consumer MDN (also referred to as a "mobile device identifier") | Mobile Device Number. | Required | 1 | Restricted String(10) |

2. Authorization Procedure

Having described an example procedure 200 for processing a request relating to a mobile device, reference will now be made to FIG. 3 to describe an example procedure 300 for authorizing a mobile wallet-related request that originates from a portal 106 associated with an MNO, in accordance with an example embodiment herein. In one example embodiment, the procedure 300 further represents the procedure described above in connection with step 206 of FIG. 2.

Figure 3:
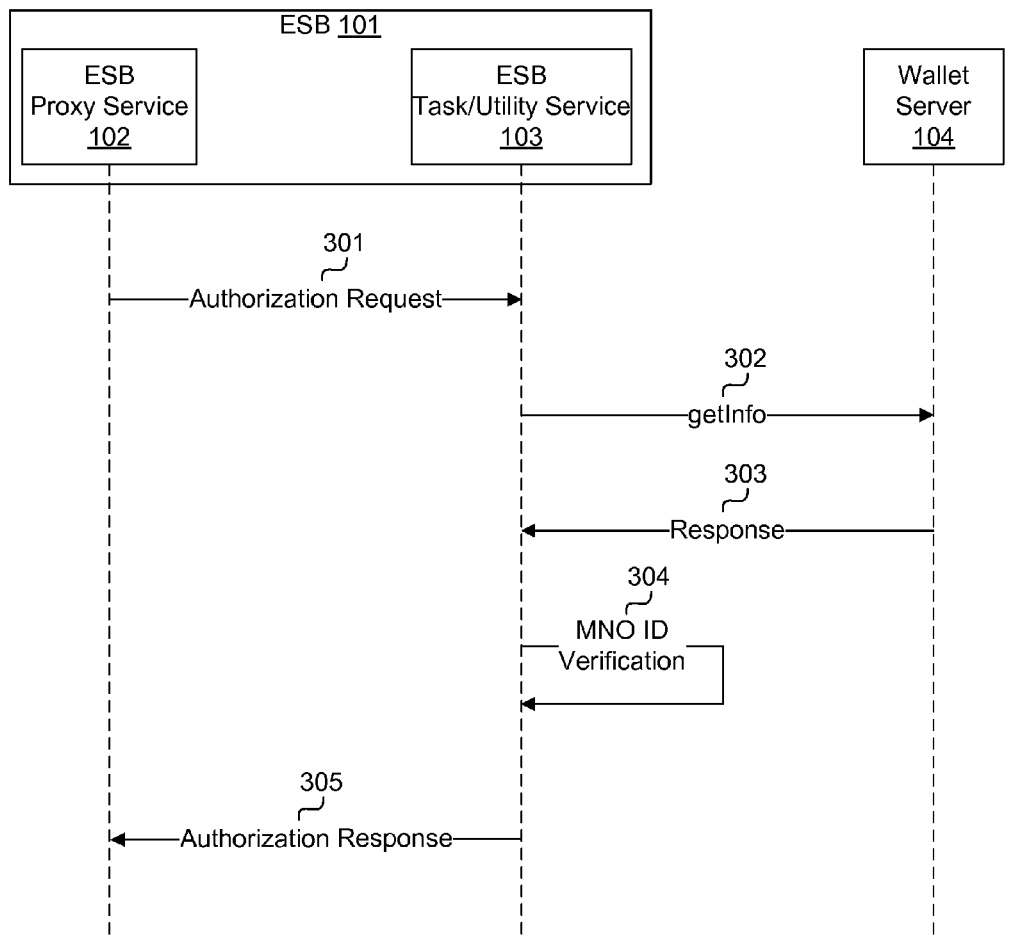
FIG. 3 shows an example procedure for authorizing a request relating to a mobile device, in accordance with an example embodiment herein.

Although not shown in FIG. 3 for purposes of convenience, prior to step 301, the ESB proxy service 102 extracts a value of a consumer MDN (also referred to as a "mobile device identifier", described above in Table 2) from the CPNI header, and extracts a value of an originator ID (also referred to as a "partner system identifier", described above in Table 1) from the message header.

At step 301, the ESB proxy service 102 transmits an authorization request message to the ESB task service 103. This causes the ESB task service 103 to communicate, at step 302, a getInfo message, including the consumer MDN, to the wallet server 104 to retrieve a partner system account list associated with the mobile device identifier.

At step 303, the wallet server 104 communicates a response to the ESB task service 103 including the partner system account list associated with the mobile device identifier.

At step 304, the ESB task service 103 determines whether the partner system account list associated with the mobile device identifier includes the partner system identifier that was extracted from the message header. If the partner system account list associated with the mobile device identifier includes the partner system identifier that was extracted from the message header, then the ESB task service 103 grants authorization of the request. If, on the other hand, the partner system account list associated with the mobile device identifier does not include the partner system identifier that was extracted from the message header, then the ESB task service 103 denies authorization of the request. In this way, each MNO entity is limited to accessing only data and/or operations relating to that particular MNO entity, and is prevented from accessing data and/or operations relating to other MNO entities.

At step 305, the ESB task service 103 communicates a response to the ESB proxy service 102 (and, in some example embodiments, to the gateway 105 and/or the portal 106), indicating whether authorization of the request has been granted or denied.

3. Requests

Having described an example procedure 300 for authorizing a request relating to a mobile device, reference will now be made to FIGS. 4 through 10 to describe example types of requests, message flows/service invocations, messages, and message parameters, in accordance with various example embodiments herein relating to MNOs.

a. Request for Consumer Profile Information

Figure 4:
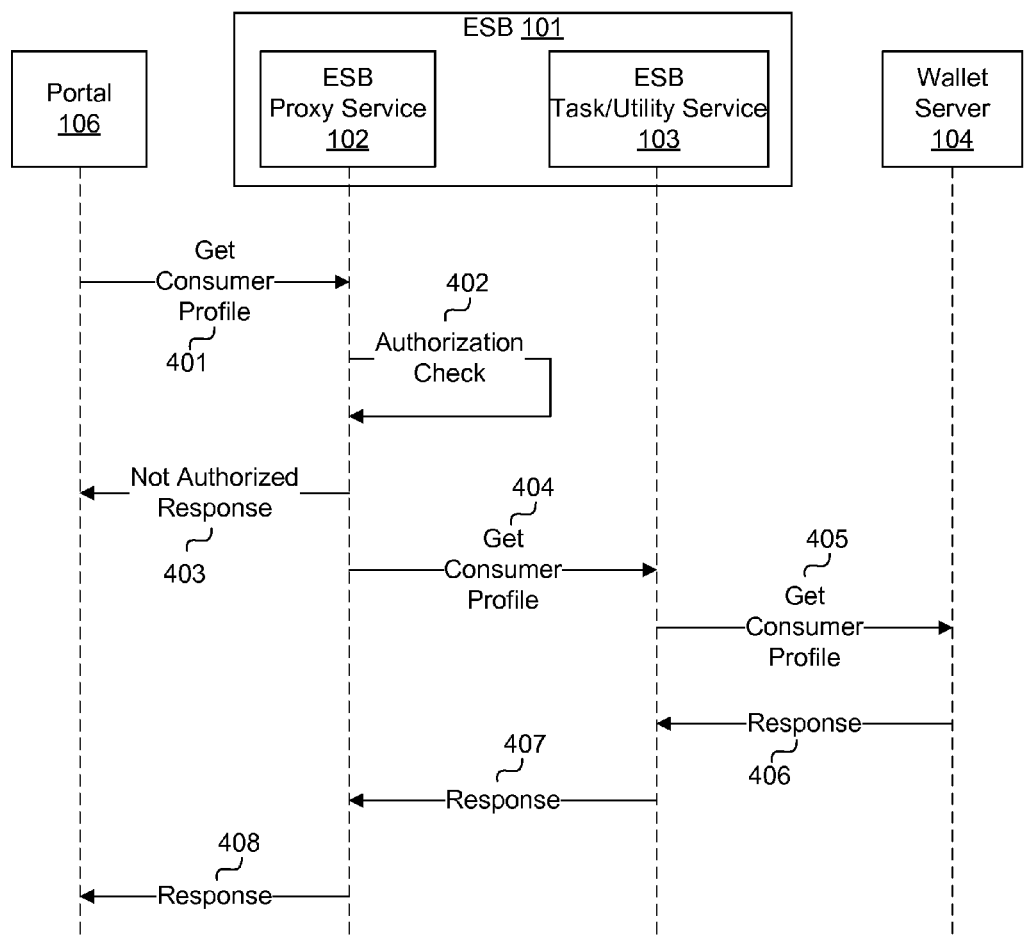
FIG. 4 shows an example procedure for processing a request for consumer profile information relating to a mobile wallet, in accordance with an example embodiment herein.

FIG. 4 shows an example procedure 400 for processing a request for consumer profile information relating to a mobile wallet, in accordance with an example embodiment herein. In one example embodiment, procedure 400 enables a partner system, such as elements 106 and/or 108 of FIG. 1 (which may be operated by an agent), to retrieve information, such as a user ID and/or user name, from the wallet server 104.

At step 401, the portal 106 transmits to the ESB proxy service 102 a request message (e.g., a get consumer profile message), including, for example, the data element described below in Table 3.

TABLE 3

| Element | Description | Required | Multi-plicity | Data Type |
| --- | --- | --- | --- | --- |
| MobileDeviceNumber | Mobile Device Number. | Required | 1 | Restricted String(10) |

At step 402, the ESB proxy service 102 executes an authorization procedure for the request, in the manner described above in connection with FIG. 3.

If authorization of the request is denied at step 402, then at step 403, the ESB proxy service 102 communicates a message (e.g., a not-authorized response message) to the portal 106 to indicate that authorization of the request is denied.

If, on the other hand, authorization of the request is granted at step 402, then at step 404, the ESB proxy service 102 communicates a message (e.g., a get consumer profile message) to the ESB task service 103.

At step 405, the ESB task service 103 communicates the message to the wallet server 104 to request consumer profile information relating to a particular mobile wallet.

At step 406, the wallet server 104 communicates a response to the ESB task service 103, which in turn communicates the response to the ESB proxy service 102 (step 407). The ESB proxy service 102 in turn communicates the response to the portal 106 (step 408). An example set of data elements that may be included in the response is described below in Table 4.

TABLE 4

| Element | Description | Required | Multi-plicity | Data Type |
| --- | --- | --- | --- | --- |
| Response | This sub-element specifies the structure for generic ESB response. | Required | 1 | Container |
| ConsumerProfile | This sub-element specifies the structure of Consumer Profile. | Optional | 1 | Container |

Although not shown in FIG. 4 for purposes of convenience, in some example embodiments herein, the ESB 101 (e.g., the ESB proxy service 102 and/or the ESB task service 103) filters data elements that are included in the response communicated from the wallet server 104 at step 406, for example, to meet requirements of the request communicated at step 401. The filtering may be performed based on, for example, one or more requirements of the request, a predetermined access level associated with a partner system from which the request originated, an agent identifier associated with the request, and/or any other suitable criteria. The response 408 provided by the ESB 101 can include, for instance, all the data elements included in the response communicated at step 406 or only a subset of the data elements included in the response communicated at step 406, the subset having been determined as a result of the filtering. Likewise, the ESB 101 can perform such filtering of other responses (e.g., responses 506, 606, 706, 806, 906, 1006, 1107, 1206, 1306, 1406, 1506, 1606, 1706, and/or 1806 described below in connection with FIGS. 5 through 18, respectively, although not explicitly shown in FIGS. 5 through 18 for purposes of convenience).

An example set of data elements that may be included in the response element shown in Table 4 is described below in Table 5.

TABLE 5

| Element | Description | Required | Multi-plicity | Data Type |
| --- | --- | --- | --- | --- |
| ResponseCode | This sub-element specifies the SUCCESS (0) or FAILURE (1) of the operation. | Required | 1 | Restricted |
| ServiceDetails | Specifies the service information such as service name, operation name and version number. | Required | 1 | Container |
| InstanceID | Specifies ESB Process Instance ID. | Required | 1 | String(256) |
| TransactionID | Specifies ESB generated Unique Identifier for a specific transaction. | Required | 1 | String(256) |
| Timestamp | Specifies time of the response. | Required | 1 | DateTime |

TABLE 5-continued

| Element | Description | Required | Multi-plicity | Data Type |
|---|---|---|---|---|
| Error | The Error element is of type ErrorType which contains the structure of Error/Exception occurrences during the execution of Operation. | Optional | 0 to 10 | Container |

An example set of data elements that may be included in the ServiceDetails element shown in Table 5 is described below in Table 6.

TABLE 6

| Element | Description | Required | Multi-plicity | Data Type |
|---|---|---|---|---|
| ServiceName | Specifies the name of the service. | Required | 1 | String(32) |
| OperationName | Specifies the name of the operation within a service. | Required | 1 | String(32) |
| Version | Specifies the version of the service. | Required | 1 | String(32) |

An example set of data elements that may be included in the Error element shown in Table 5 is described below in Table 7.

TABLE 7

| Element | Description | Required | Multi-plicity | Data Type |
|---|---|---|---|---|
| ErrorCode | This specifies error code associated for each exception. | Required | 1 | Integer |
| ErrorType | This specifies the type of error/exception. Valid values are: APPLICATION_EXCEPTION - any validations or business rules violations. BUSINESS_EXCEPTION- Actual exception generated from the outbound end system. SYSTEM_EXCEPTION - Any internal system failure exception within the ESB layer. | Required | 1 | Restricted |
| ErrorSeverity | Error Severity. Valid values includes 1 - Fatal/Critical, 2 - Medium, 3 - low. | Required | 1 | Restricted |
| ErrorMessage | Human Readable error message. | Required | 1 | String (256) |
| ErrorDescription | Description of error. | Optional | 1 | String |
| ErrorTrace | Specifies detailed error. | Optional | 1 | String |

An example set of data elements that may be included in the ConsumerProfile element shown in Table 4 is described below in Table 8.

TABLE 8

| Element | Description | Required | Multi-plicity | Data Type |
|---|---|---|---|---|
| SecurityAnswerAvailable | Indicates whether user has set up security question/answer; the default value is 'false'. | Required | 1 | BooleanType |
| PersonalInfo | This sub-element specifies the structure of personal Info. | Optional | 1 | Container |
| ConsumerStatus | Status of the consumer. Defined statuses include: ACTIVE, INACTIVE, LOCKED, SUSPENDED. | Optional | 1 | Restrict |
| ConsumerCreationDate | Date Timestamp when consumer record is created. | Optional | 1 | DateTime |

An example set of data elements that may be included in the PersonalInfo element shown in Table 8 is described below in Table 9.

TABLE 9

| Element | Description | Required | Multi-plicity | Data Type |
|---|---|---|---|---|
| UserNameInfo | Contains user name related info. | Optional | 1 | Container |
| ContactInfo | Contains user contact info. | Optional | 1 | Container |

An example set of data elements that may be included in the UserNameInfo element shown in Table 9 is described below in Table 10.

TABLE 10

| Element | Description | Required | Multi-plicity | Data Type |
|---|---|---|---|---|
| Salutation | This specifies the salutation of username. Valid values are: Mr., Ms., Mrs. | Optional | 1 | Restricted |
| Firstname | First Name. | Optional | 1 | String (32) |
| MiddleName | Middle Name. | Optional | 1 | String (16) |
| Lastname | Last Name. | Optional | 1 | String (32) |
| Suffix | Suffix of the user. | Optional | 1 | String (2) |

A data element that may be included in the ContactInfo element shown in Table 9 is described below in Table 11.

TABLE 11

| Element | Description | Required | Multi-plicity | Data Type |
|---|---|---|---|---|
| EmailID | Email address - this is the email ID used for wallet activation, it will return as part of the response for an existing consumer. | Optional | 1 | Restricted | b. Request for Mobile Wallet Information

Figure 5:
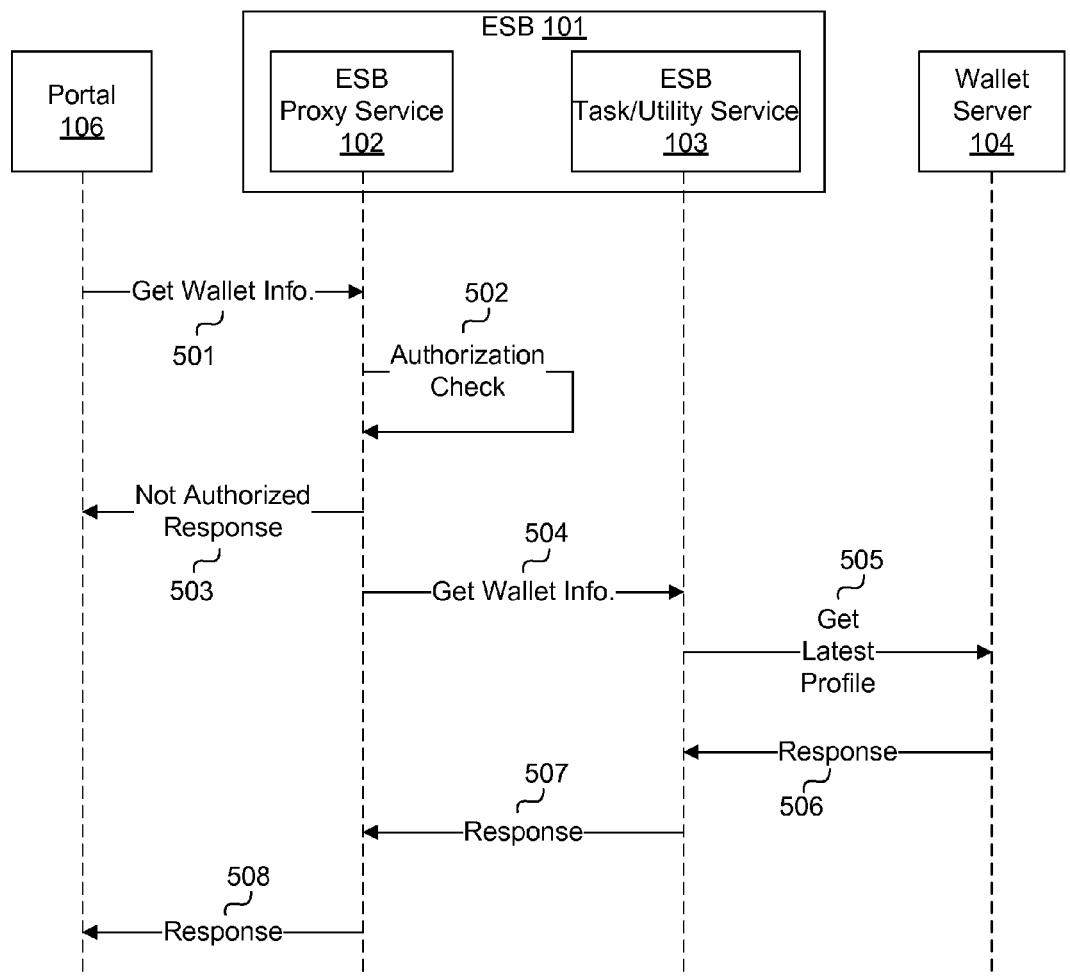
FIG. 5 shows an example procedure for processing a request for mobile wallet information, in accordance with an example embodiment herein.

FIG. 5 shows an example procedure 500 for processing a request for mobile wallet information, in accordance with an example embodiment herein. In one example embodiment, procedure 500 enables a partner system, such as elements 106 and/or 108 of FIG. 1 (which may be operated by an agent), to retrieve from the wallet server 104 information relating to a mobile wallet, such as a handset profile and/or a number of payment cards associated with the mobile wallet.

At step 501, the portal 106 transmits to the ESB proxy service 102 a request message (e.g., a get wallet info. message), including, for example, the data element described below in Table 12.

TABLE 12

| Element | Description | Required | Multi-plicity | Data Type |
| --- | --- | --- | --- | --- |
| MobileDeviceNumber | Mobile Device Number. | Required | 1 | Restricted String(10) |

At step 502, the ESB proxy service 102 executes an authorization procedure for the request, in the manner described above in connection with FIG. 3.

If authorization of the request is denied at step 502, then at step 503, the ESB proxy service 102 communicates a message (e.g., a not authorized response message) to the portal 106 to indicate that authorization of the request is denied.

If, on the other hand, authorization of the request is granted at step 502, then at step 504, the ESB proxy service 102 communicates a message (e.g., a get wallet info. message) to the ESB task service 103.

At step 505, the ESB task service 103 communicates the message to the wallet server 104 to request consumer profile information relating to a particular mobile wallet.

At step 506, the wallet server 104 communicates a response to the ESB task service 103, which in turn communicates the response to the ESB proxy service 102 (step 507). The ESB proxy service 102 in turn communicates the response to the portal 106 (step 508). An example set of data elements that may be included in the response is described below in Table 13.

TABLE 13

| Element | Description | Required | Multi-plicity | Data Type |
| --- | --- | --- | --- | --- |
| Response | This sub-element specifies the structure for generic ESB response. | Required | 1 | Container |
| WalletInfo | This sub-element specifies the structure of WalletInfo. | Optional | 1 | Container |

An example set of data elements that may be included in the WalletInfo element shown in Table 13 is described below in Table 14.

TABLE 14

| Element | Description | Required | Multi-plicity | Data Type |
| --- | --- | --- | --- | --- |
| WalletInstance | This sub-element contains aspects of wallet. | Optional | 1 | Container |
| Handset | This sub-element contains aspects of handset. | Optional | 1 | Container |

TABLE 14-continued

| Element | Description | Required | Multi-plicity | Data Type |
| --- | --- | --- | --- | --- |
| ServiceAccount | This sub-element contains aspects of service account. | Required | 1 | Container |

An example data element that may be included in the WalletInstance element shown in Table 14 is described below in Table 15.

TABLE 15

| Element | Description | Required | Multi-plicity | Data Type |
| --- | --- | --- | --- | --- |
| WalletState | Indicates the current status of the wallet instance. | Required | 1 | String (32) |
| WalletStateReasonCode | Describes the reasons that land the wallet in its current state. | Required | 1 | String |
| WalletCreationDate | Date timestamp that the wallet instance is created. Equates to the date that the customer activates his/her wallet. | Optional | 1 | DateTime |
| WalletClientVersion | Version number of the wallet client app. | Required | 1 | String (10) |
| WalletStateUpdateInitiator | Who is responsible for the last state of the wallet. | Optional | 1 | String |

An example set of data elements that may be included in the HandSet element shown in Table 14 is described below in Table 16.

TABLE 16

| Element | Description | Required | Multi-plicity | Data Type |
| --- | --- | --- | --- | --- |
| HandsetID | This sub-element contains choices of handset ID. | Required | 1 | Container |
| HandsetProfile | This sub-element contains aspects of handset profile. | Required | 1 | Container |
| HandsetState | Indicates the current state of the handset. | Required | 1 | Restricted String (16) |
| MobileDeviceNumber | The phone number associated to this handset. | Required | 1 | Restricted String (10) |
| MobileNetwork Operator (MNO) | This sub-element contains MNO-related info. | Required | 1 | Container |

An example set of data elements that may be included in the HandSetID element shown in Table 16 is described below in Table 17.

TABLE 17

| Element | Description | Required | Multiplicity | Data Type |
|---|---|---|---|---|
| IMEI | The International Mobile Equipment Identity or IMEI is a number, usually unique, to identify global system for mobile communications (GSM), wideband code division multiple access (WCDMA), and integrated digital enhanced network (iDEN) mobile phones, as well as some satellite phones. It is usually found printed inside the battery compartment of the phone. | Required while other options not given | 0 . . . 1 | String (15) |
| MEID | Mobile Equipment Identifier (MEID) is a globally unique number identifying a physical piece of code division multiple access (CDMA) mobile station equipment. | Required while other options not given | 0 . . . 1 | String (14) |
| MACAddress | A unique identifier assigned to network interfaces for communications on the physical network segment. | Required while other options not given | 0 . . . 1 | String (12) |

An example set of data elements that may be included in the HandsetProfile element shown in Table 16 is described below in Table 18.

TABLE 18

| Element | Description | Required | Multiplicity | Data Type |
|---|---|---|---|---|
| ModelNumber | Model number associated with the handset. | Required | 1 | String (64) |
| HandsetManufacturer | This sub-element contains manufacturer details of the handset. | Required | 1 | Container |
| ModelName | Name of the handset model. | Required | 1 | String (64) |
| OSPlatform | Name of the operation system platform. | Optional | 1 | String |
| OSVersion | Version of the operation system platform. | Optional | 1 | String (32) |
| DeviceSoftwareClass | This is the device software class of the handset. | Optional | 1 | String (32) |

An example set of data elements that may be included in the HandsetManufacturer element shown in Table 18 is described below in Table 19.

TABLE 19

| Element | Description | Required | Multiplicity | Data Type |
|---|---|---|---|---|
| ManufacturerID | Manufacturer ID of the handset. | Required | 1 | String (32) |
| ManufacturerName | Name of the handset manufacturer. | Optional | 1 | String (32) |
| ManufacturerDescription | Description of the manufacturer. | Optional | 1 | String (256) |

An example set of data elements that may be included in the MobileNetworkOperator (MNO) element shown in Table 16 is described below in Table 20.

TABLE 20

| Element | Description | Required | Multiplicity | Data Type |
|---|---|---|---|---|
| MobileNetworkOperatorID | Unique Identifier for the Mobile Network Operator; Valid values, e.g.: MNO1, MNO2, MNO3. | Required | 1 | Restricted String (16) |
| MobileNetworkOperatorName | MNO name. | Required | 1 | String (16) |
| MobileNetworkOperatorDescription | MNO description. | Optional | 1 | String (256) |
| MobileNetworkOperatorContactNumber | MNO contact number. | Optional | 1 | String (16) |

An example data element that may be included in the ServiceAccount element shown in Table 14 is described below in Table 21.

TABLE 21

| Element | Description | Required | Multiplicity | Data Type |
|---|---|---|---|---|
| NumberOfPaymentCards | Indicates the number of payment cards in the wallet. | Required | 1 | Integer | c. Request for Wallet Event History

Figure 6:
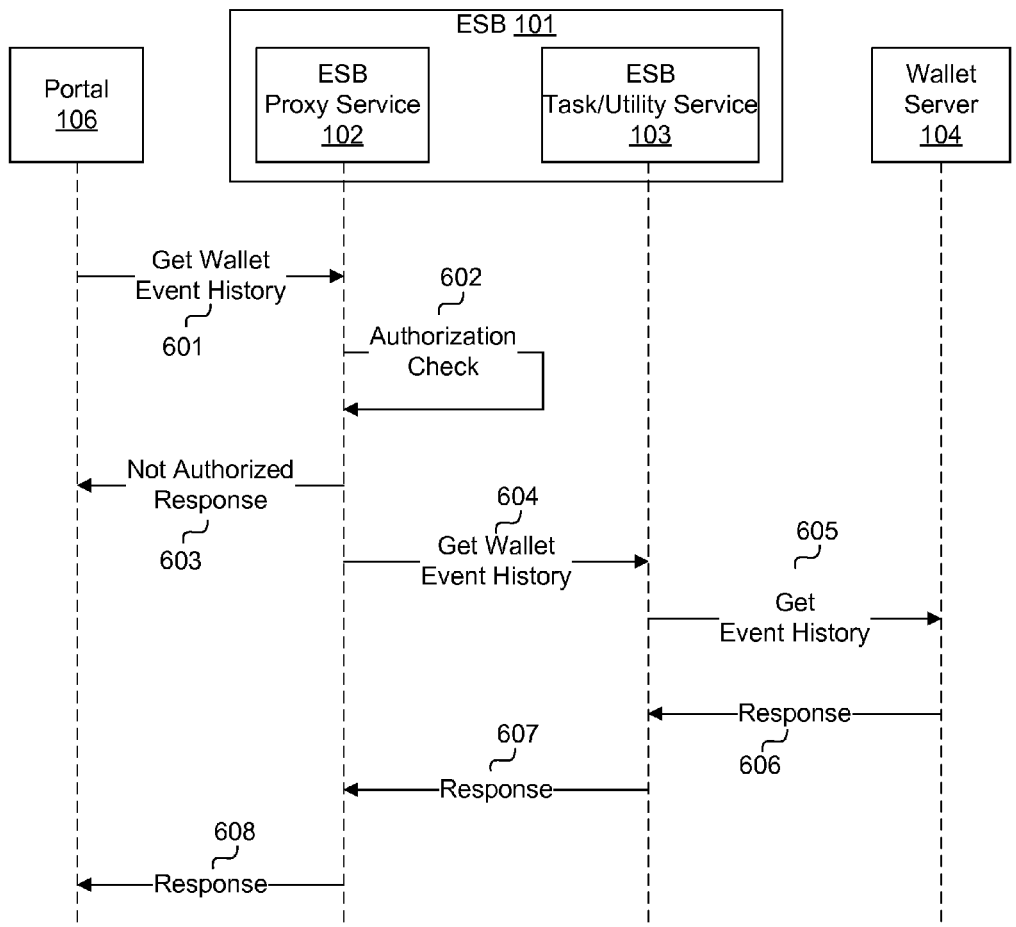
FIG. 6 shows an example procedure for processing a request for wallet event history relating to a mobile wallet, in accordance with an example embodiment herein.

FIG. 6 shows an example procedure 600 for processing a request for wallet event history relating to a mobile wallet, in accordance with an example embodiment herein. In one example embodiment, procedure 600 enables a partner system, such as elements 106 and/or 108 of FIG. 1 (which may be operated by an agent), to retrieve from the wallet server 104 wallet event history information, such as an event date or an event source.

At step 601, the portal 106 transmits to the ESB proxy service 102 a request message (e.g., a get wallet event history message), including, for example, the data elements described below in Table 22.

TABLE 22

| Element | Description | Required | Multi-plicity | Data Type |
|---|---|---|---|---|
| MobileDeviceNumber | Unique consumer identifier. | Required | 1 | Restricted String (10) |
| StartFrom | Index to specify from where to get history event. The value needs to be >0. | Required | 1 | Integer |
| Size | Size of history event to be returned; the value depends on pagination practice at the presentation layer. It cannot exceed 100 based on the upper bound number defined in wallet event history list. | Required | 1 | Integer |

At step 602, the ESB proxy service 102 executes an authorization procedure for the request, in the manner described above in connection with FIG. 3.

If authorization of the request is denied at step 602, then at step 603, the ESB proxy service 102 communicates a message (e.g., a not authorized response message) to the portal 106 to indicate that authorization of the request is denied.

If, on the other hand, authorization of the request is granted at step 602, then at step 604, the ESB proxy service 102 communicates a message (e.g., a get wallet event history message) to the ESB task service 103.

At step 605, the ESB task service 103 communicates the message (e.g., the get wallet event history message) to the wallet server 104 to request wallet event history information relating to a particular mobile wallet.

At step 606, the wallet server 104 communicates a response to the ESB task service 103, which in turn communicates the response to the ESB proxy service 102 (step 607). The ESB proxy service 102 in turn communicates the response to the portal 106 (step 608). An example set of data elements that may be included in the response is described below in Table 23.

TABLE 23

| Element | Description | Required | Multi-plicity | Data Type |
|---|---|---|---|---|
| Response | This sub-element specifies the structure for generic ESB response. | Required | 1 | Container |
| TotalCount | The total count of wallet event history records. | Optional | 1 | Integer |
| StartIndex | Where to start the records. | Optional | 1 | Integer |
| EndIndex | Where to end the records. | Optional | 1 | Integer |
| WalletEventHistory | List of wallet event history. | Optional | 0 to 100 | Container |

An example set of data elements that may be included in the WalletEventHistory element shown in Table 23 is described below in Table 24.

TABLE 24

| Element | Description | Required | Multi-plicity | Data Type |
|---|---|---|---|---|
| EventID | Event identifier. | Required | 1 | String (32) |
| EventName | Event name. | Required | 1 | String |
| EventDescription | Description for the event. | Required | 1 | String |
| EventDetails | Event Details. | Required | 1 | String |
| EventSource | The source that generates the event. | Required | 1 | String |
| EventDateTime | Timestamp when event occurs. | Required | 1 | DateTime | d. Request for Predetermined Processing Workflow Execution Status

Figure 7:
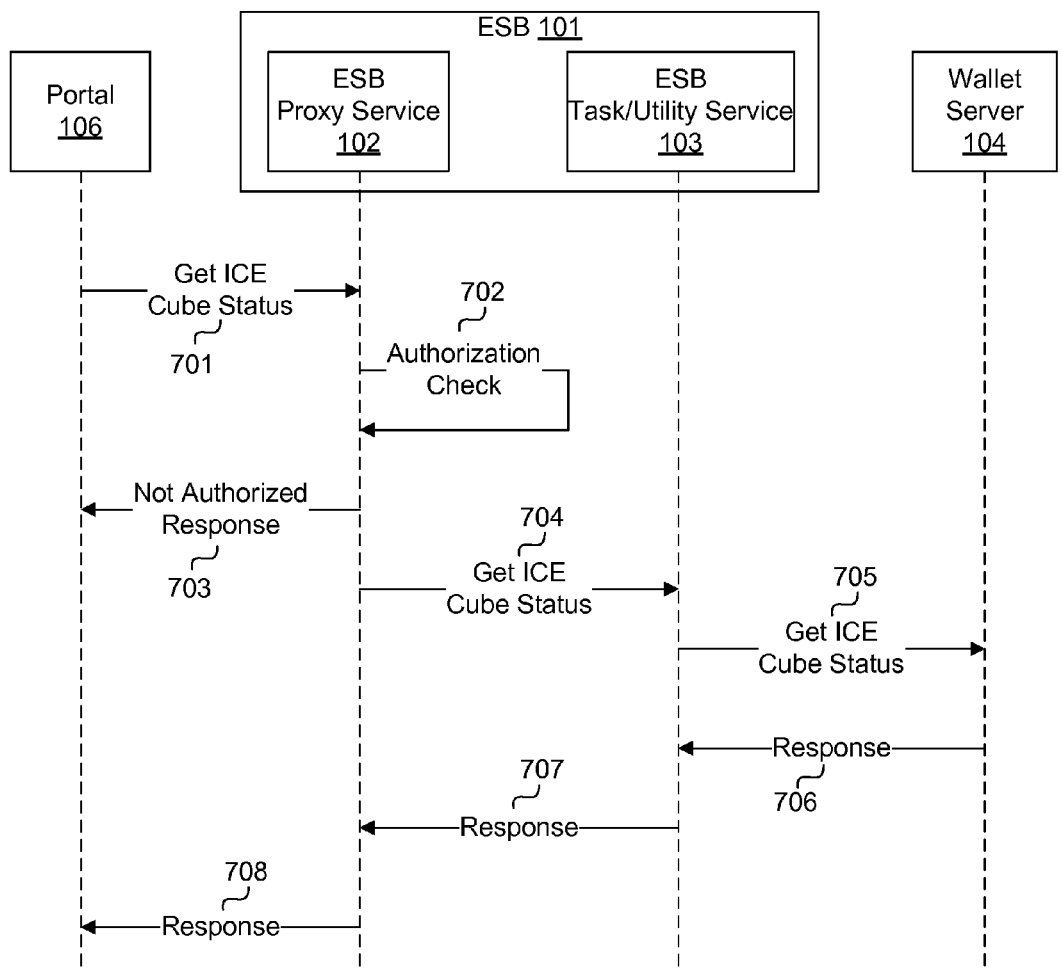
FIG. 7 shows an example procedure for processing a request for status regarding executions of predetermined processing workflows relating to a mobile wallet, in accordance with an example embodiment herein.

FIG. 7 shows an example procedure 700 for processing a request for status regarding executions of predetermined processing workflows relating to a mobile wallet, in accordance with an example embodiment herein. A predetermined processing workflow (also referred to as an ICE cube), in one example, can be executed for one or more mobile devices, and can include instructions that cause one or more systems to perform multiple steps (e.g., by executing specific functions) in succession. In one example embodiment, procedure 700 enables a partner system, such as for example, elements 106 and/or 108 of FIG. 1 (which may be operated by an agent), to retrieve from the wallet server 104 overall aggregated status from all executions of predetermined processing workflows for a particular mobile device number (associated with a mobile wallet).

At step 701, the portal 106 transmits to the ESB proxy service 102 a request message (e.g., a get ICE cube status message), including, for example, the data element described below in Table 25.

TABLE 25

| Element | Description | Required | Multi-plicity | Data Type |
|---|---|---|---|---|
| MobileDeviceNumber | Mobile Device Number. | Required | 1 | Restricted String(10) |

At step 702, the ESB proxy service 102 executes an authorization procedure for the request, in the manner described above in connection with FIG. 3.

If authorization of the request is denied at step 702, then at step 703, the ESB proxy service 102 communicates a message (e.g., a not authorized response message) to the portal 106 to indicate that authorization of the request is denied.

If, on the other hand, authorization of the request is granted at step 702, then at step 704, the ESB proxy service 102 communicates a message (e.g., a get ICE cube status message) to the ESB task service 103.

At step 705, the ESB task service 103 communicates the message (e.g., the get ICE cube status message) to the wallet server 104 to request ICE cube status information relating to a particular mobile wallet.

At step 706, the wallet server 104 communicates a response to the ESB task service 103, which in turn communicates the response to the ESB proxy service 102 (step 707). The ESB proxy service 102 in turn communicates the response to the portal 106 (step 708). An example set of data elements that may be included in the response is described below in Table 26.

TABLE 26

| Element | Description | Required | Multiplicity | Data Type |
|---|---|---|---|---|
| OverallICECubeExecutionStatus | Aggregated ICE Cube execution status. Valid values include: SUCCESS, FAILED and IN_PROCESS. | Optional | 1 | Restricted String (50) |
| LastUpdateTime | Date timestamp of the last update. | Optional | 1 | DateTime | e. Request to Update a Mobile Wallet State

Figure 8:
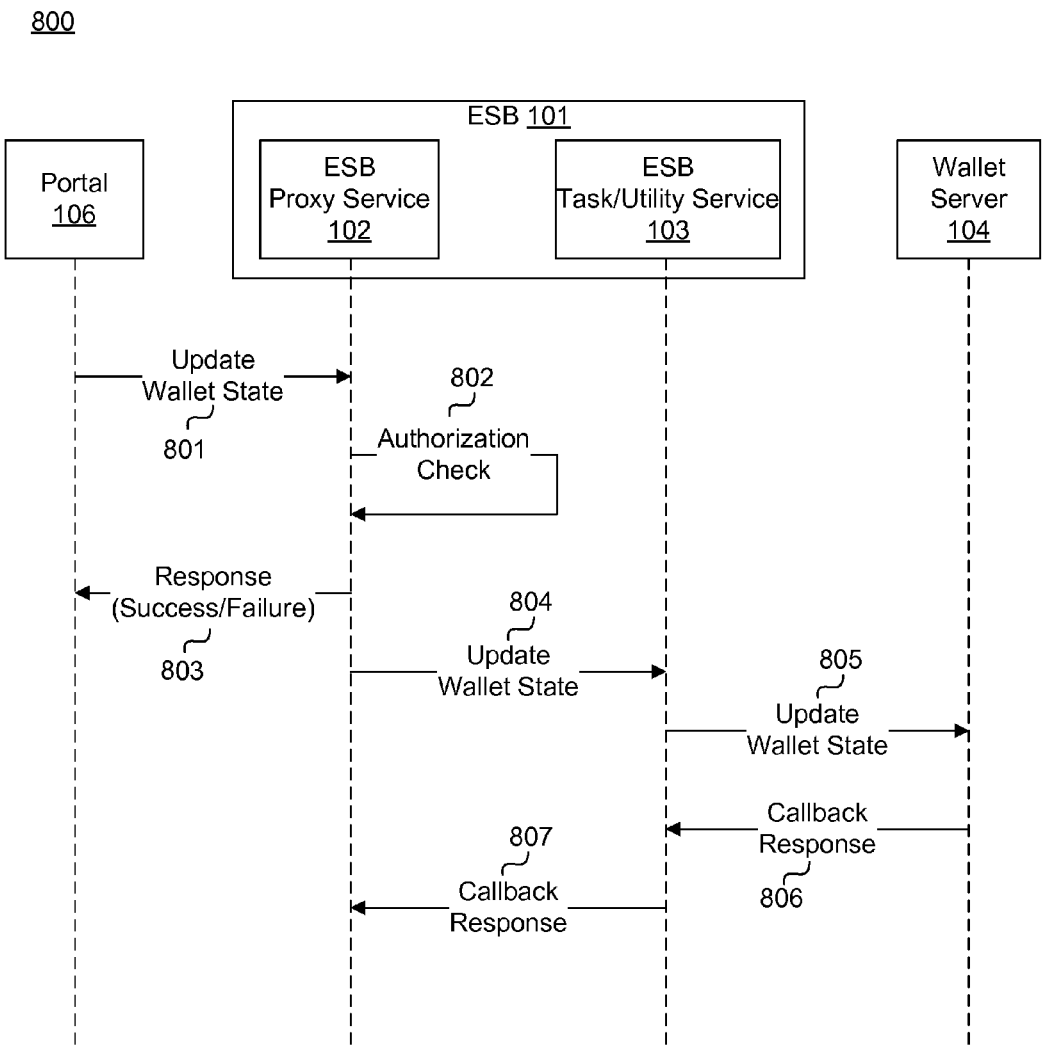
FIG. 8 shows an example procedure for processing a request to update a mobile wallet state, in accordance with an example embodiment herein.

FIG. 8 shows an example procedure 800 for processing a request to update a mobile wallet state, in accordance with an example embodiment herein. In one example embodiment, procedure 800 enables a partner system, such as elements 106 and/or 108 of FIG. 1 (which may be operated by an agent), to request to suspend, reactivate, or terminate a mobile wallet.

At step 801, the portal 106 transmits to the ESB proxy service 102 a request message (e.g., an update wallet state message), including, for example, the set of data elements described below in Table 27.

TABLE 27

| Element | Description | Required | Multiplicity | Data Type |
|---|---|---|---|---|
| WalletStateUpdateInitiator | Initiator of the wallet state update. | Required | 1 | Restricted String |
| WalletStateUpdateReason | Reason for wallet state update. | Required | 1 | String(256) |
| MobileDeviceNumber | Mobile Device Number. | Required | 1 | Restricted String(10) |
| WalletInstanceID | Unique number used to identify a specific wallet instance. | Optional | 1 | Positive Integer (17 digits) |
| WalletState | State to which the wallet needs to be changed. | Required | 1 | Restricted String(32) |

At step 802, the ESB proxy service 102 executes an authorization procedure for the request, in the manner described above in connection with FIG. 3.

If authorization of the request is denied at step 802, then at step 803, the ESB proxy service 102 communicates a message (e.g., a success/failure message) to the portal 106 to indicate that authorization of the request is denied.

If, on the other hand, authorization of the request is granted at step 802, then at step 804, the ESB proxy service 102 communicates a message (e.g., an update wallet state message) to the ESB task service 103.

At step 805, the ESB task service 103 communicates the message (e.g., the update wallet state message) to the wallet server 104 to request that a wallet state relating to a particular mobile wallet be updated.

At step 806, the wallet server 104 communicates a response to the ESB task service 103, which in turn communicates the response to the ESB proxy service 102 (step 807). An example data element that may be included in the response is described below in Table 28.

TABLE 28

| Element | Description | Required | Multiplicity | Data Type |
|---|---|---|---|---|
| Response | This sub-element specifies the structure for generic ESB response. | Required | 1 | Container | f. Request to Reset a Password

Figure 9:
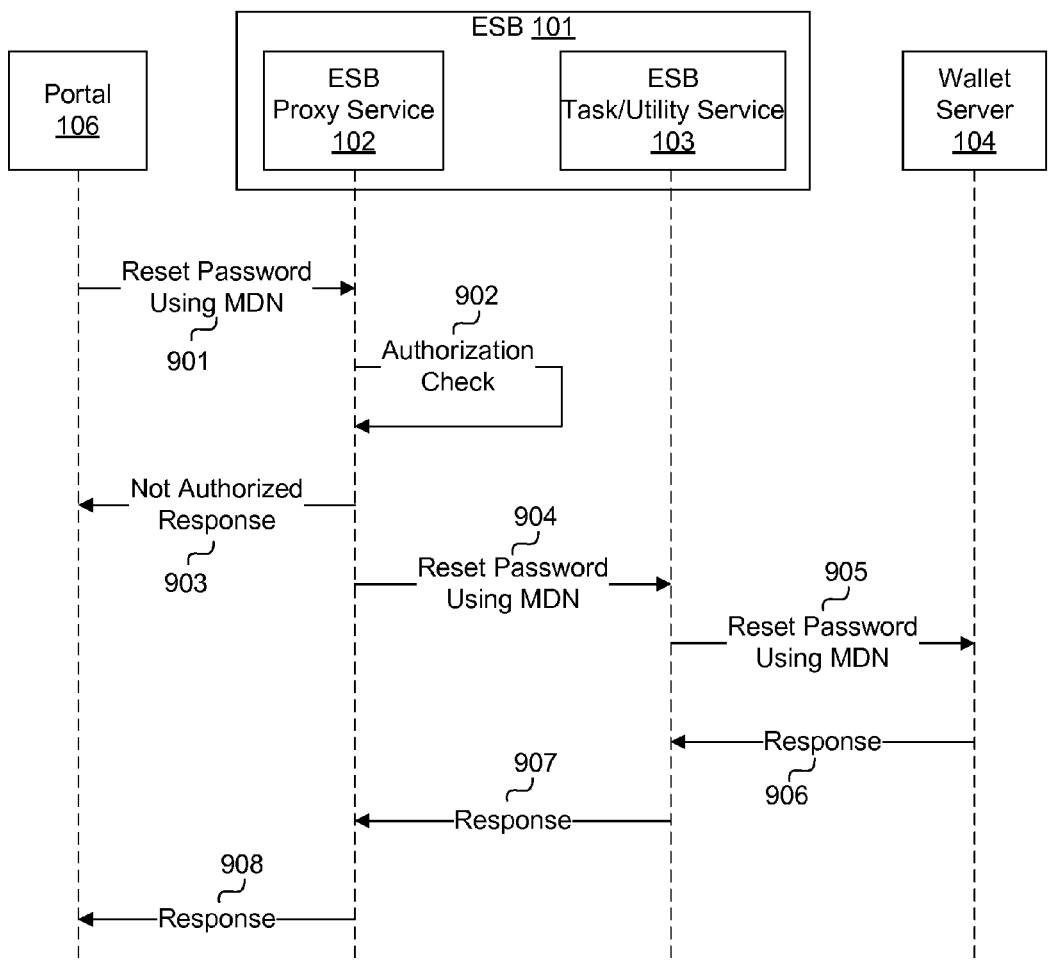
FIG. 9 shows an example procedure for processing a request to reset a password relating to a mobile wallet, in accordance with an example embodiment herein.

FIG. 9 shows an example procedure 900 for processing a request to reset a password associated with a mobile wallet, in accordance with an example embodiment herein. In one example embodiment, procedure 900 enables a partner system, such as elements 106 and/or 108 of FIG. 1 (which may be operated by an agent), to reset a password relating to a mobile wallet (e.g., a web account password).

At step 901, the portal 106 transmits to the ESB proxy service 102 a request message (e.g., a reset password message), including, for example, the data element described below in Table 29.

TABLE 29

| Element | Description | Required | Multiplicity | Data Type |
|---|---|---|---|---|
| MobileDeviceNumber | Mobile Device Number. | Required | 1 | Restricted String(10) |

At step 902, the ESB proxy service 102 executes an authorization procedure for the request, in the manner described above in connection with FIG. 3.

If authorization of the request is denied at step 902, then at step 903, the ESB proxy service 102 communicates a message (e.g., a not authorized response message) to the portal 106 to indicate that authorization of the request is denied.

If, on the other hand, authorization of the request is granted at step 902, then at step 904, the ESB proxy service 102 communicates a message (e.g., a reset password message) to the ESB task service 103.

At step 905, the ESB task service 103 communicates the message (e.g., the reset password message) to the wallet server 104 to request that a password associated with a particular mobile wallet be reset.

At step 906, the wallet server 104 communicates a response to the ESB task service 103, which in turn communicates the response to the ESB proxy service 102 (step 907). The ESB proxy service 102 in turn communicates the response to the portal 106 (step 908). An example data element that may be included in the response is described below in Table 30.

TABLE 30

| Element | Description | Required | Multiplicity | Data Type |
|---|---|---|---|---|
| Response | This sub-element specifies the structure for generic ESB response. | Required | 1 | Container | g. Request to Reset a Security Question and Answer

Figure 10:
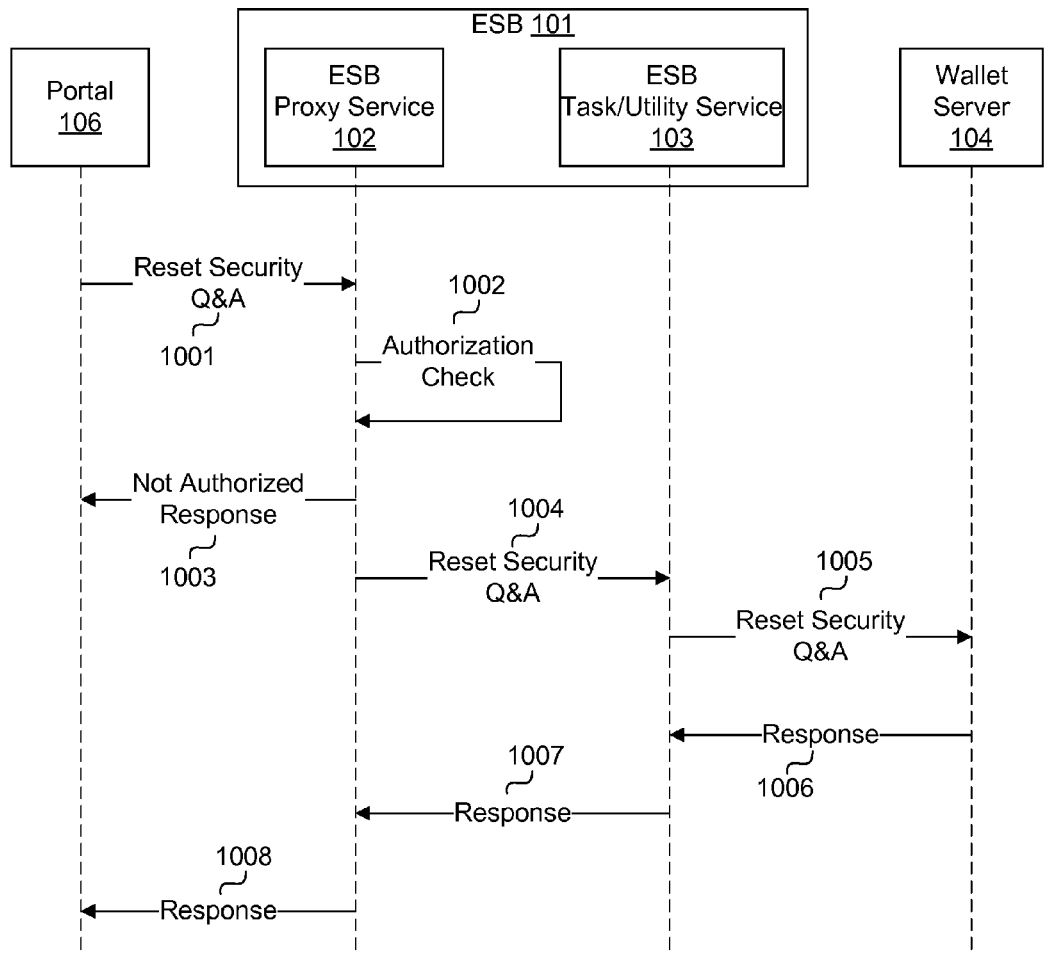
FIG. 10 shows an example procedure for processing a request to reset a security question and answer relating to a mobile wallet, in accordance with an example embodiment herein.

FIG. 10 shows an example procedure 1000 for processing a request to reset a security question and answer relating to a mobile wallet, in accordance with an example embodiment herein. In one example embodiment, procedure 1000 enables a partner system, such as elements 106 and/or 108 of FIG. 1

(which may be operated by an agent), to reset a security question and answer relating to a mobile wallet.

At step 1001, the portal 106 transmits to the ESB proxy service 102 a request message (e.g., a reset security Q&A message), including, for example, the data element described below in Table 31.

TABLE 31

| Element | Description | Required | Multiplicity | Data Type |
|---|---|---|---|---|
| MobileDeviceNumber | Mobile Device Number. | Required | 1 | Restricted String(10) |

At step 1002, the ESB proxy service 102 executes an authorization procedure for the request, in the manner described above in connection with FIG. 3.

If authorization of the request is denied at step 1002, then at step 1003, the ESB proxy service 102 communicates a message (e.g., a not authorized response message) to the portal 106 to indicate that authorization of the request is denied.

If, on the other hand, authorization of the request is granted at step 1002, then at step 1004, the ESB proxy service 102 communicates a message (e.g., a reset security Q&A message) to the ESB task service 103.

At step 1005, the ESB task service 103 communicates the message (e.g., the reset security Q&A message) to the wallet server 104 to request that a security question and answer relating to a particular mobile wallet be reset.

At step 1006, the wallet server 104 communicates a response to the ESB task service 103, which in turn communicates the response to the ESB proxy service 102 (step 1007). The ESB proxy service 102 in turn communicates the response to the portal 106 (step 1008). An example data element that may be included in the response is described below in Table 32.

TABLE 32

| Element | Description | Required | Multiplicity | Data Type |
|---|---|---|---|---|
| Response | This sub-element specifies the structure for generic ESB response. | Required | 1 | Container |

C. Issuers

Having described various example embodiments for processing a mobile wallet-related request received from a MNO with respect to FIGS. 3 through 10, reference will now be made to FIGS. 11 through 17 to describe various aspects of messages, data elements, and/or data flows that may be employed in connection with requests that originate from a portal 106 associated with an issuer, in accordance with various example embodiments herein.

1. Message Structure

In one example, a request that originates from a portal 106 associated with an issuer includes at least three components: a message header, an HTTP header, and a message body. An example set of data elements that may be included in the message header are described below in Table 33.

TABLE 33

| Element | Description | Required | Multiplicity | Data Type |
|---|---|---|---|---|
| Reference ID | A unique message identifier (UUID) for each message generated by the calling client. Used for tracking purpose from client. Same Reference ID will be provided back to the synchronous response and also asynchronous call back response. | Optional | 1 | String (256) |
| Transaction ID | UUID for each message generated in ESB Layer. Also called GUID in Oracle ESB terms. | Optional | 1 | String (256) |
| Originator ID (also referred to as a "partner system identifier") | Originator who creates message; in some cases may be appended/added to request by gateway 105. | Optional | 1 | String (32) |
| DateTime Stamp | Date and time when the message is invoked. Provided by calling client. | Optional | 1 | DateTime |

An example data element that may be included in the HTTP header is described below in Table 34.

TABLE 34

| Element | Description | Required | Data type |
|---|---|---|---|
| SERVICE_PROVIDER_ID | Service_ID or identifier of the issuer or service provider who initiates the request. | Mandatory | String |

2. Authorization Procedure

Figure 11:
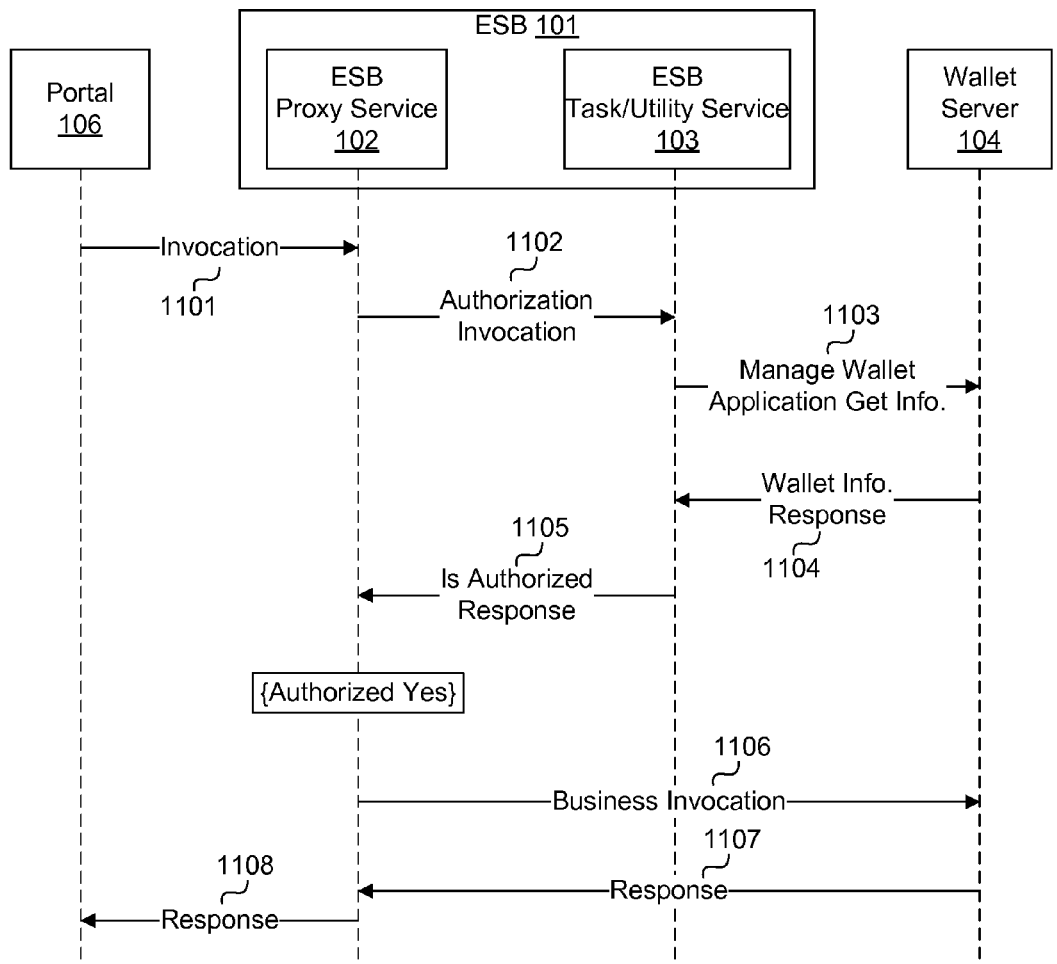
FIG. 11 shows an example procedure for authorizing a request relating to a mobile device, in accordance with an example embodiment herein.

FIG. 11 shows an example procedure 1100 for authorizing a mobile device-related request that originates from a portal 106 associated with an issuer, in accordance with an example embodiment herein. In one example embodiment, the procedure 1100 further represents the procedure described above in connection with step 206 of FIG. 2.

Although not shown in FIG. 11 for purposes of convenience, prior to step 1101, the ESB proxy service 102 extracts a value of a service provider ID (also referred to as a "partner system identifier", described above in Table 34) from the HTTP header, and extracts a value of a consumer MDN (also referred to as a "mobile device identifier") from the message body.

At step 1101, the ESB proxy service 102 receives a request message (e.g., an invocation message) from the portal 106.

At step 1102, the ESB proxy service 102 transmits an authorization request message to the ESB task service 103. This causes the ESB task service 103 to communicate, at step 1103, a getInfo message, including the extracted consumer MDN, to the wallet server 104 to retrieve a partner system account list associated with the mobile device identifier.

At step 1104, the wallet server 104 communicates a response to the ESB task service 103 including the partner system account list associated with the mobile device identifier.

The ESB task service 103 then determines whether the partner system account list associated with the mobile device identifier includes the partner system identifier that was extracted from the message header. If the partner system account list associated with the mobile device identifier includes the partner system identifier that was extracted from the message header, then the ESB task service 103 grants authorization of the request. If, on the other hand, the partner system account list associated with the mobile device identifier does not include the partner system identifier that was extracted from the message header, then the ESB task service 103 denies authorization of the request. In this way, each issuer entity is limited to accessing only data and/or operations relating to or permitted for that particular issuer entity, and is prevented from accessing data and/or operations relating to other issuer entities.

At step 1105, the ESB task service 103 communicates a response (e.g., an "is authorized" response or an "is not authorized" response) to the ESB proxy service 102, indicating whether authorization of the request has been granted or denied.

At step 1106, if authorization of the request is granted, then the ESB proxy service 102 communicates, based on the invocation message received at step 1101, to the wallet server 104 a request for information and/or performance of an operation relating to a mobile device.

At step 1107, the wallet server 104 communicates a response to the ESB proxy service 102, which, in turn, communicates the response to the portal 106 at step 1108.

3. Requests

Having described an example procedure 1100 for authorizing a request relating to a mobile device, reference will now be made to FIGS. 12 through 17 to describe example types of requests, message flows/service invocations, messages, and message parameter, in accordance with various example embodiments herein relating to issuers.

a. Request for Consumer Profile Information

Figure 12:
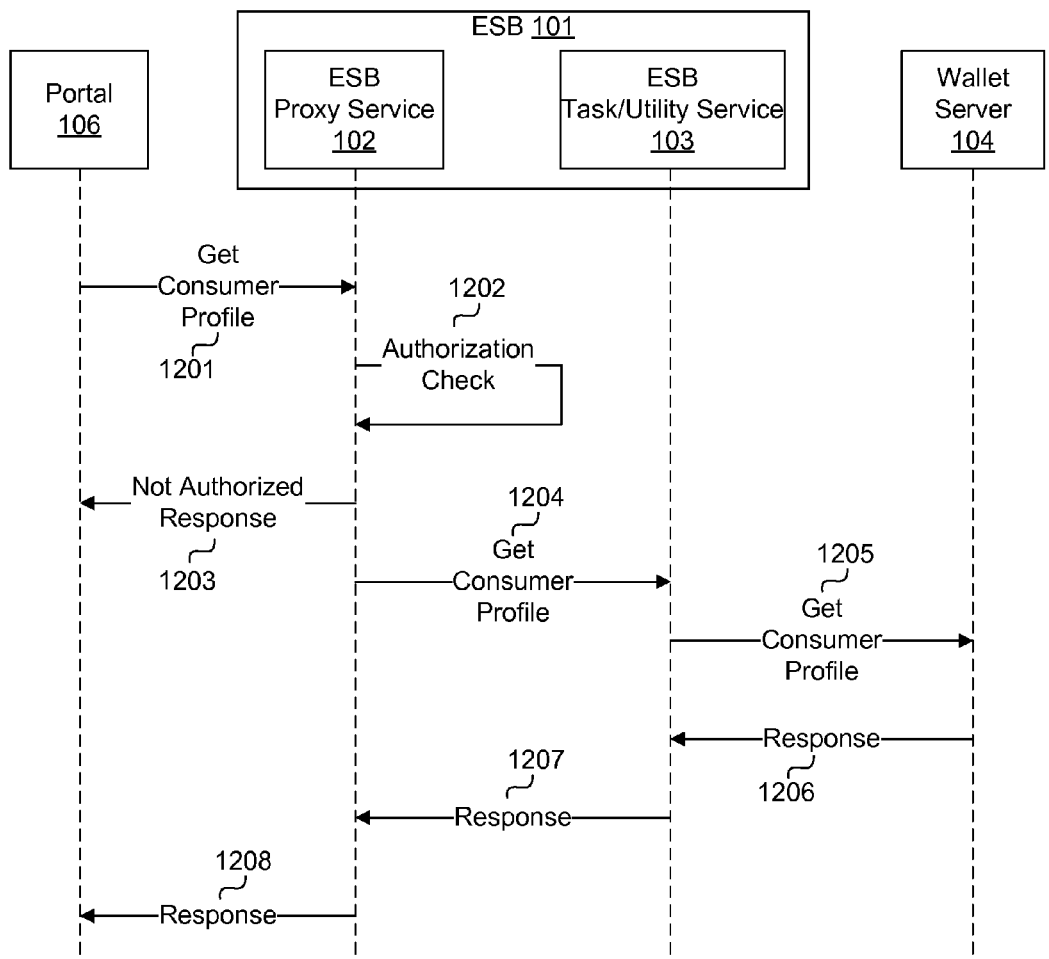
FIG. 12 shows an example procedure for processing a request for consumer profile information relating to a mobile wallet, in accordance with an example embodiment herein.

FIG. 12 shows an example procedure 1200 for processing a request for consumer profile information relating to a mobile wallet, in accordance with an example embodiment herein. In one example embodiment, procedure 1200 enables a partner system, such as elements 106 and/or 108 of FIG. 1 (which may be operated by an agent), to retrieve information, such as a user ID and/or user name, from the wallet server 104.

At step 1201, the portal 106 transmits to the ESB proxy service 102 a request message (e.g., a get consumer profile message), including, for example, the set of data elements described below in Table 35.

TABLE 35

| Element | Description | Required | Multiplicity | Data Type |
|---|---|---|---|---|
| GetConsumerProfile Request | A root element for the request message which is used by GetConsumerProfile operation. | Required | 1 | Container |
| MobileDeviceNumber | Mobile Device Number. | Required | 1 | String |

At step 1202, the ESB proxy service 102 executes an authorization procedure for the request, in the manner described above in connection with FIG. 11.

If authorization of the request is denied at step 1202, then at step 1203, the ESB proxy service 102 communicates a message (e.g., a not authorized response message) to the portal 106 to indicate that authorization of the request is denied.

If, on the other hand, authorization of the request is granted at step 1202, then at step 1204, the ESB proxy service 102 communicates a message (e.g., a get consumer profile message) to the ESB task service 103.

At step 1205, the ESB task service 103 communicates the message to the wallet server 104 to request consumer profile information relating to a particular mobile wallet.

At step 1206, the wallet server 104 communicates a response to the ESB task service 103, which in turn communicates the response to the ESB proxy service 102 (step 1207). The ESB proxy service 102 in turn communicates the response to the portal 106 (step 1208). An example set of data elements that may be included in the response is described below in Table 36.

TABLE 36

| Element | Description | Required | Multiplicity | Data Type |
|---|---|---|---|---|
| Response | This sub-element specifies the structure for generic ESB response. | Required | 1 | Container |
| UserNameInfo | This sub-element specifies the structure for UserName. | Optional | 1 | Container |
| UserID | The user ID that the consumer will be used to sign-in to the portal application. This ID must be unique. | Optional | 1 | String |
| ConsumerStatus | Status of the consumer. Potential statuses include:—ACTIVE, INACTIVE, LOCKED, SUSPENDED. | Optional | 1 | Restricted |
| ZipCode | Zip Code of consumer. | Optional | 1 | Integer |

An example set of data elements that may be included in the UserNameInfo element shown in Table 36 is described below in Table 37.

TABLE 37

| Element | Description | Required | Multiplicity | Data Type |
|---|---|---|---|---|
| Salutation | This specifies the salutation of username. Valid | Optional | 1 | Restricted |

TABLE 37-continued

| Element | Description | Required | Multiplicity | Data Type |
|---|---|---|---|---|
| | values are: Mr., Ms., Mrs. | | | |
| Firstname | First name of user name. | Optional | 1 | String(32) |
| MiddleName | Middle name of user name. | Optional | 1 | String(16) |

TABLE 37-continued

| Element | Description | Required | Multiplicity | Data Type |
|---|---|---|---|---|
| Lastname | Last name of user name. | Optional | 1 | String(32) |
| Suffix | Suffix of the user. | Optional | 1 | String(2) |

An example set of data elements that may be included in the Response element shown in Table 36 is described below in Table 38.

TABLE 38

| Element | Description | Required | Multiplicity | Data Type |
|---|---|---|---|---|
| ResponseCode | This sub-element specifies the SUCCESS (0) or FAILURE (1) of the operation. | Required | 1 | Restricted |
| ServiceDetails | Specifies the service information like service name, operation name | Required | 1 | Container |

TABLE 38-continued

| Element | Description | Required | Multiplicity | Data Type |
|---|---|---|---|---|
| | and version number. | | | |
| InstanceId | Specifies ESB Process Instance ID. | Required | 1 | String(256) |
| TransactionID | Specifies ESB generated Unique Identifier for a specific transaction. | Required | 1 | String(256) |
| Timestamp | Specifies time of the Response. | Required | 1 | DateTime |
| Error | The Error element is of type ErrorType which contains the structure of Error/Exception occurs during the execution of operation. | Optional | 0 to 10 | Container |

An example set of data elements that may be included in the ServiceDetails element shown in Table 38 is described below in Table 39.

TABLE 39

| Element | Description | Required | Multiplicity | Data Type |
|---|---|---|---|---|
| ServiceName | Specifies the name of the Service. | Required | 1 | String(32) |
| OperationName | Specifies the name of the operation within a service. | Required | 1 | String(32) |
| Version | Specifies the version of the service. | Required | 1 | String(32) |

An example set of data elements that may be included in the Error element shown in Table 38 is described below in Table 40.

TABLE 40

| Element | Description | Required | Multiplicity | Data Type |
|---|---|---|---|---|
| ErrorCode | This specifies error code associated for each exception. | Required | 1 | Integer |
| ErrorType | This specifies the type of error/exception. Valid values are APPLICATION_ EXCEPTION—any validations or business rules violations. BUSINESS_ EXCEPTION— Actual exception generated from the outbound end system. SYSTEM_EXCEPTION—Any internal system failure exception within the ESB layer. | Required | 1 | Restricted |
| ErrorSeverity | Error Severity. Valid values include: 1—Fatal, 2—Critical. | Required | 1 | Restricted |
| ErrorMessage | Human Readable error message. | Required | 1 | String (256) |
| ErrorDescription | Description of error. | Optional | 1 | String |
| ErrorTrace | Specifies detailed error stack trace. | Optional | 1 | String | b. Request for Mobile Wallet Information

Figure 13:
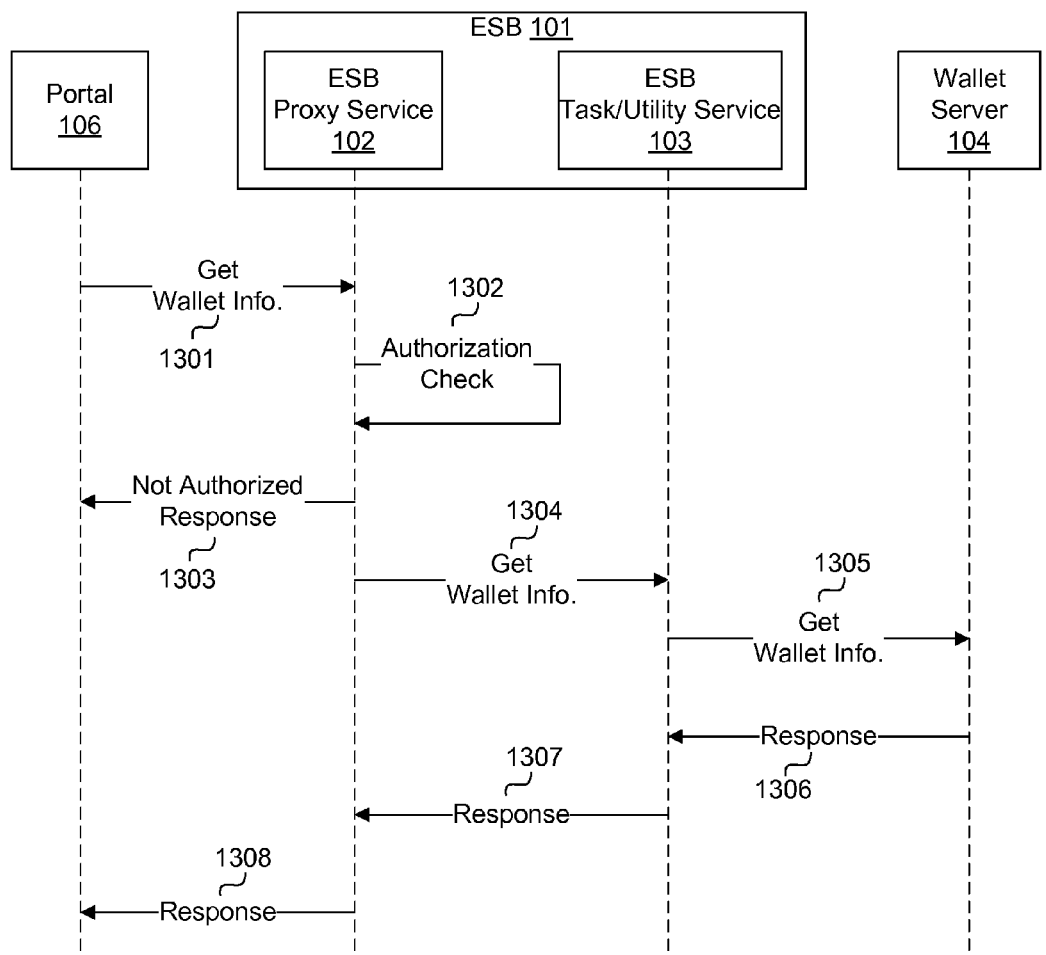
FIG. 13 shows an example procedure for processing a request for mobile wallet information, in accordance with an example embodiment herein.

FIG. 13 shows an example procedure 1300 for processing a request for mobile wallet information, in accordance with an example embodiment herein. In one example embodiment, procedure 1300 enables a partner system, such as elements 106 and/or 108 of FIG. 1 (which may be operated by an agent), to retrieve from the wallet server 104 information relating to a mobile wallet, such as a handset profile and/or a number of payment cards associated with the mobile wallet.

At step 1301, the portal 106 transmits to the ESB proxy service 102 a request message (e.g., a get wallet info. message), including, for example, the data elements described below in Table 41.

TABLE 41

| Element | Description | Required | Multiplicity | Data Type |
| --- | --- | --- | --- | --- |
| GetWalletInfoRequest | A root element for the request message which is used by GetWalletInfo operation. | Required | 1 | Container |
| MobileDeviceNumber | Unique consumer identifier. | Required | 1 | String |

At step 1302, the ESB proxy service 102 executes an authorization procedure for the request, in the manner described above in connection with FIG. 11.

If authorization of the request is denied at step 1302, then at step 1303, the ESB proxy service 102 communicates a message (e.g., a not authorized response message) to the portal 106 to indicate that authorization of the request is denied.

If, on the other hand, authorization of the request is granted at step 1302, then at step 1304, the ESB proxy service 102 communicates a message (e.g., a get wallet info. message) to the ESB task service 103.

At step 1305, the ESB task service 103 communicates the message to the wallet server 104 to request consumer profile information relating to a particular mobile wallet.

At step 1306, the wallet server 104 communicates a response to the ESB task service 103, which in turn communicates the response to the ESB proxy service 102 (step 1307). The ESB proxy service 102 in turn communicates the response to the portal 106 (step 1308). An example set of data elements that may be included in the response is described below in Table 42.

TABLE 42

| Element | Description | Required | Multiplicity | Data Type |
| --- | --- | --- | --- | --- |
| Response | This sub-element specifies the structure for generic ESB response. | Required | 1 | Container |
| WalletInfo | This sub-element specifies the structure of WalletInfo. | Optional | 0 to 100 | Container |

An example set of data elements that may be included in the WalletInfo element shown in Table 42 is described below in Table 43.

TABLE 43

| Element | Description | Required | Multiplicity | Data Type |
| --- | --- | --- | --- | --- |
| HandSet | This sub-element specifies the structure for HandSet. | Optional | 1 | Container |
| WalletCreationDate | The Wallet Creation Date. | Optional | 1 | DateTime |
| WalletState | Indicates the current wallet state. Valid values include: WALLET_ACTIVE—Wallet is Active; WALLET_ACTIVATION_PENDING—Wallet Activation is Pending; WALLET_SUSPENDED—Wallet is Suspended; WALLET_SUSPENSION_PENDING—Wallet Suspension is Pending; WALLET_RESETPASSCODE_PENDING—Wallet ResetPasscode is Pending; WALLET_TERMINATED—Wallet is Terminated; WALLET_TERMINATION_PENDING—Wallet Termination is Pending; WALLET_LOCKED—Wallet is locked; WALLET_RESUME_PENDING Wallet ReActivation is Pending; WALLET_MDN_VALIDATION_PENDING Wallet MDN validation is Pending; CHANGE_DETECTED Change Detected; APP_DATA_ERASED Wallet is terminated and the application data has been successfully removed from the consumer device. | Optional | 1 | Restricted |
| WalletStateReasonCode | Describes the reason that the wallet is in its current state. Potential reason codes include the following: MNO Initiated, Consumer Initiated, Mobile Wallet Provider Initiated, | Optional | 1 | String |

TABLE 43-continued

| Element | Description | Required | Multiplicity | Data Type |
|---|---|---|---|---|
| | Lost/Stolen, Expiration Date Reached. | | | |
| WalletInstanceID | Unique number used to identify a specific wallet instance. | Optional | 1 | Wallet Instance ID Type |
| WalletClientVersion | Represents Wallet Client App Version. | Optional | 1 | String 10 Type (string: with 10 characters) |

An example set of data elements that may be included in the HandSet element shown in Table 43 is described below in Table 44.

TABLE 44

| Element | Description | Required | Multiplicity | Data Type |
|---|---|---|---|---|
| HandsetID | Unique identifier of the handset. Handset ID is the IMEI for GSM devices and the MEID for CDMA handsets. | Required | 1 | Container |
| HandsetProfile | This sub-element specifies the structure for HandSet Profile. | Required | 1 | Container |
| HandsetState | Current state of the handset. List of valid status includes: Active, Inactive, Suspended. | Optional | 1 | Restricted |

An example set of data elements that may be included in the HandSetID element shown in Table 44 is described below in Table 45.

TABLE 45

| Element | Description | Required | Multiplicity | Data Type |
|---|---|---|---|---|
| IMEI | The International Mobile Equipment Identity or IMEI is a number, usually unique, to identify global system for mobile communications (GSM), wideband code division multiple access (WCDMA), and integrated digital enhanced network (iDEN) mobile phones, as well as some satellite phones. It is usually found printed inside the battery compartment of the phone. | Required while other options not given | 0...1 | String (15) |
| MEID | Mobile Equipment Identifier (MEID) is a globally unique number identifying a physical piece of code division multiple access (CDMA) mobile station equipment. | Required while other options not given | 0...1 | String (14) |
| MACAddress | A unique identifier assigned to network interfaces for communications on the physical network segment. | Required while other options not given | 0...1 | String (12) |

An example set of data elements that may be included in the HandsetProfile element shown in Table 44 is described below in Table 46.

TABLE 46

| Element | Description | Required | Multiplicity | Data Type |
|---|---|---|---|---|
| ModelNumber | Model number associated with the handset. | Required | 1 | String (64) |
| HandsetManufacturer | This sub-element contains manufacturer details of the handset. | Required | 1 | Container |
| ModelName | Name of the handset model. | Required | 1 | String (64) |

TABLE 46-continued

| Element | Description | Required | Multiplicity | Data Type |
|---|---|---|---|---|
| OSPlatform | Name of the operation system platform. | Optional | 1 | String |
| OSVersion | Version of the operation system platform. | Optional | 1 | String (32) |
| Device SoftwareClass | Device software class of the handset. | Optional | 1 | String (32) |
| MobileDeviceNumber | Mobile Number of the handset. | Required | 1 | String(10) |
| MobileNetworkOperator | Mobile Network Operator—Refers to the participating wireless service providers. | Required | 1 | Container |

An example set of data elements that may be included in the HandsetManufacturer element shown in Table 46 is described below in Table 47.

TABLE 47

| Element | Description | Required | Multiplicity | Data Type |
|---|---|---|---|---|
| ManufacturerID | The unique ID for the Manufacturer in Wallet Platform. | Required | 1 | iwt: Manufacturer ID Type |
| ManufacturerName | Name of the handset manufacturer. | Optional | 1 | iwt: Manufacturer ID Type |
| ManufacturerDescription | Description of the manufacturer. | Optional | 1 | String (256) |

An example set of data elements that may be included in the MobileNetworkOperator (MNO) element shown in Table 46 is described below in Table 48.

TABLE 48

| Element | Description | Required | Multiplicity | Data Type |
|---|---|---|---|---|
| MobileNetworkOperatorID | Unique Identifier for the Mobile Network Operator; valid values: MNO1, MNO2, MNO3. | Required | 1 | Restricted |
| MobileNetworkOperator Name | Textual name associated with the MNO. | Required | 1 | String (16) |
| MobileNetworkOperator Description | Textual description of the MNO. | Optional | 1 | String (256) |
| MobileNetworkOperator ContactNumber | Operator Contact Phone Number. | Optional | 1 | String (16) | c. Request for Service Account Information

Figure 14:
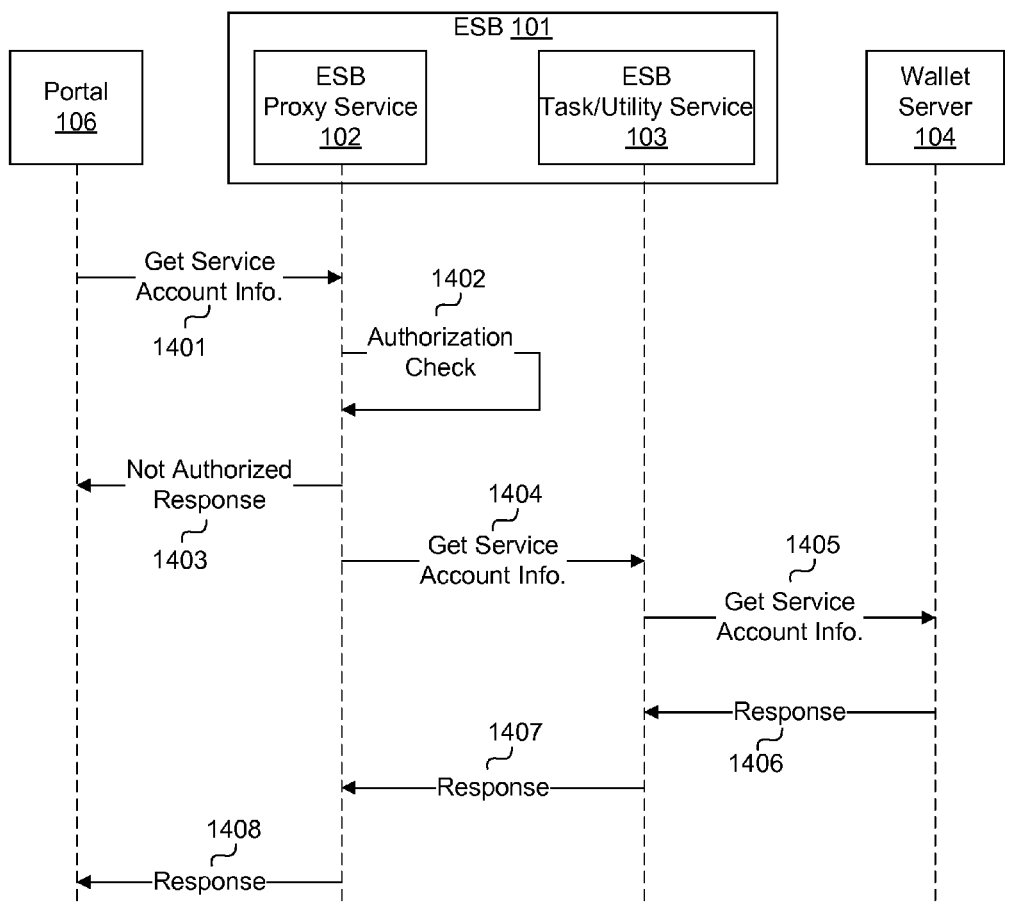
FIG. 14 shows an example procedure for processing a request for service account information relating to a mobile wallet, in accordance with an example embodiment herein.

FIG. 14 shows an example procedure 1400 for processing a request for service account information relating to a mobile wallet, in accordance with an example embodiment herein. In one example embodiment, procedure 1400 enables a partner system, such as elements 106 and/or 108 of FIG. 1 (which may be operated by an agent), to retrieve from the wallet server 104 service account information, such as a record of history for a service account relating to a mobile wallet.

At step 1401, the portal 106 transmits to the ESB proxy service 102 a request message (e.g., a get service account info. message), including, for example, the data elements described below in Table 49.

TABLE 49

| Element | Description | Required | Multiplicity | Data Type |
|---|---|---|---|---|
| GetServiceAccount InfoRequest | A root element for the request message which is used by GetServiceAccountInfo operation. | Required | 1 | Container |
| MobileDeviceNumber | Unique consumer Identifier. | Required | 1 | String |

At step 1402, the ESB proxy service 102 executes an authorization procedure for the request, in the manner described above in connection with FIG. 11.

If authorization of the request is denied at step 1402, then at step 1403, the ESB proxy service 102 communicates a message (e.g., a not authorized response message) to the portal 106 to indicate that authorization of the request is denied.

If, on the other hand, authorization of the request is granted at step 1402, then at step 1404, the ESB proxy service 102 communicates a message (e.g., a get service account info. message) to the ESB task service 103.

At step 1405, the ESB task service 103 communicates the message (e.g., the get service account info. message) to the wallet server 104 to request service account information relating to a particular mobile wallet.

At step 1406, the wallet server 104 communicates a response to the ESB task service 103, which in turn communicates the response to the ESB proxy service 102 (step 1407). The ESB proxy service 102 in turn communicates the response to the portal 106 (step 1408). An example set of data elements that may be included in the response is described below in Table 50.

TABLE 50

| Element | Description | Required | Multiplicity | Data Type |
|---|---|---|---|---|
| Response | This sub-element specifies the structure for generic ESB response. | Required | 1 | Container |
| ServiceAccount | This sub-element specifies the structure for Service Account. | Optional | 0 to 2500 | Container |

An example set of data elements that may be included in the ServiceAccount element shown in Table 50 is described below in Table 51.

TABLE 51

| Element | Description | Required | Multiplicity | Data Type |
|---|---|---|---|---|
| Service AccountRef Nbr | A unique number provided by the service provider to uniquely identify a service account. | Required | 1 | Restricted |
| ServiceProduct Type | Type of the Service Product. Service Product Types: CREDIT, LINKED_CHECKING_OR_DEBIT, PRE_PAID, CASH. | Required | 1 | Restricted |
| ProductBrand ProfileID | Unique identifier for the service product associated with the service account. | Required | 1 | Restricted |
| Payment Network | The network for payment processing. Valid values: NETWORK1, NETWORK2, NETWORK3. | Required | 1 | Restricted |
| ServiceAccount State | Indicates the current state of the service account. Possible status values are: REGISTERED—indicates the service account has been sent to the handset but the wallet instance associated with the MDN has not yet been activated; WAITING_FOR_ACTIVATION— service account has been provisioned to the handset but the user has not activated the account; ACTIVE—service account is active on the handset and usable by the user; SUSPENDED—use of the service account has been frozen by the issuer/ service provider. Service account in SUSPENDED state cannot be used for purchases but can be used for payments applied to the account. A service account in frozen state can be changed back to Active state; | Optional | 1 | Restricted |

TABLE 51-continued

| Element | Description | Required | Multiplicity | Data Type |
|---|---|---|---|---|
| | CLOSED_TO_NEW_PURCHASES—service account has been closed by either the owner or the issuer/service provider. An account in this state cannot be used for purchases but is still available for payments to be applied to the account; CLOSED—service account has been closed by either the owner or the issuer/service provider. Service account in Closed state cannot be used and cannot be changed back to Active state. | | | | d. Request for Wallet Event History

Figure 15:
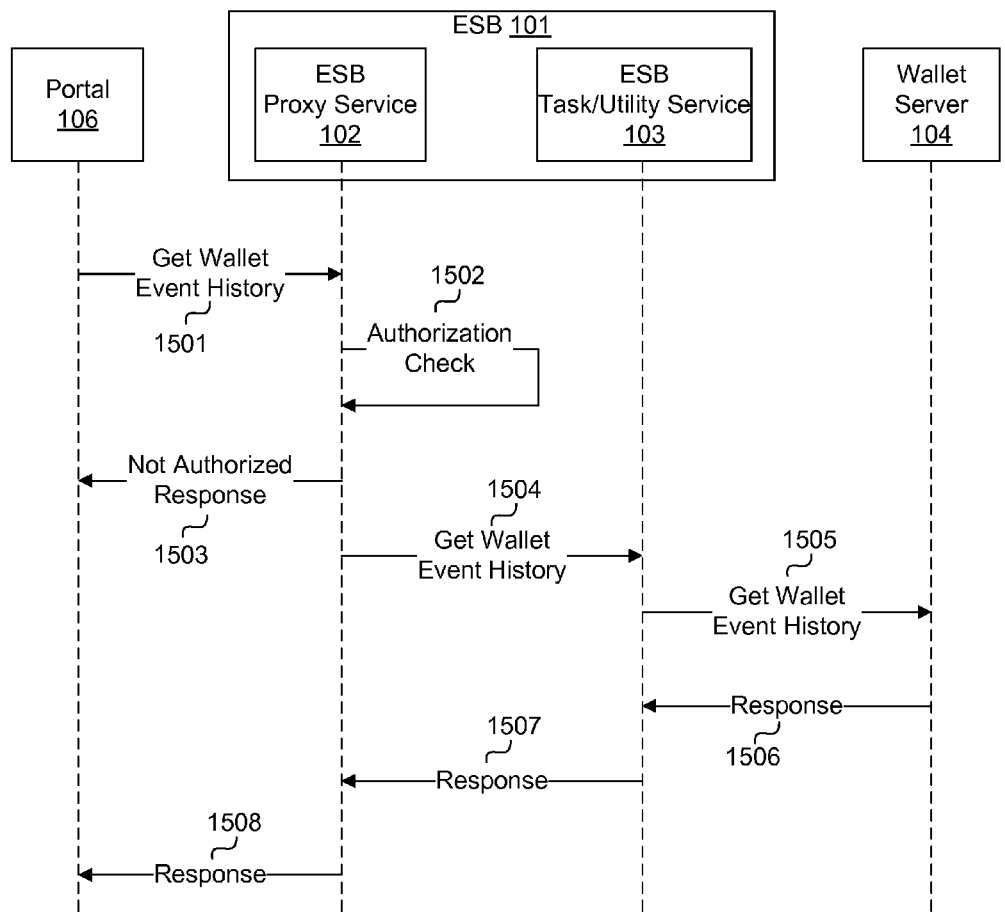
FIG. 15 shows an example procedure for processing a request for wallet event history relating to a mobile wallet, in accordance with an example embodiment herein.

FIG. 15 shows an example procedure 1500 for processing a request for wallet event history relating to a mobile wallet, in accordance with an example embodiment herein. There can be various events recorded in connection with a mobile wallet, such as, for example the provision of the wallet, the termination of the wallet, and/or the like. In one example embodiment, procedure 1500 enables a partner system, such as for example, elements 106 and/or 108 of FIG. 1 (which may be operated by an agent), to retrieve from the wallet server 104 wallet event history information, such as an event date or an event source.

At step 1501, the portal 106 transmits to the ESB proxy service 102 a request message (e.g., a get wallet event history message), including, for example, the data elements described below in Table 52.

TABLE 52

| Element | Description | Required | Multiplicity | Data Type |
|---|---|---|---|---|
| GetWalletEventHistoryRequest | A root element for the request message which is used by GetWalletEventHistory operation. | Required | 1 | Container |
| MobileDeviceNumber | Unique consumer identifier. | Required | 1 | String |
| StartFrom | Index to specify from where to get history event. | Required | 1 | Integer |
| Size | Size of history event to be returned. | Required | 1 | Integer |

At step 1502, the ESB proxy service 102 executes an authorization procedure for the request, in the manner described above in connection with FIG. 11.

If authorization of the request is denied at step 1502, then at step 1503, the ESB proxy service 102 communicates a message (e.g., a not authorized response message) to the portal 106 to indicate that authorization of the request is denied.

If, on the other hand, authorization of the request is granted at step 1502, then at step 1504, the ESB proxy service 102 communicates a message (e.g., a get wallet event history message) to the ESB task service 103.

At step 1505, the ESB task service 103 communicates the message (e.g., the get wallet event history message) to the wallet server 104 to request wallet event history information relating to a particular mobile wallet.

At step 1506, the wallet server 104 communicates a response to the ESB task service 103, which in turn communicates the response to the ESB proxy service 102 (step 1507). The ESB proxy service 102 in turn communicates the response to the portal 106 (step 1508). An example set of data elements that may be included in the response is described below in Table 53.

TABLE 53

| Element | Description | Required | Multiplicity | Data Type |
|---|---|---|---|---|
| Response | This sub-element specifies the structure for generic ESB response. | Required | 1 | Generic Response Type |
| TotalCount | The total count of wallet event history records. | Optional | 1 | Integer |
| StartIndex | Where to start the records. | Optional | 1 | Integer |

TABLE 53-continued

| Element | Description | Required | Multiplicity | Data Type |
|---|---|---|---|---|
| EndIndex | Where to end the records. | Optional | 1 | Integer |
| WalletEventHistory | List of wallet event history. | Optional | 0 to 100 | Wallet Event History Type |

An example set of data elements that may be included in the WalletEventHistory element shown in Table 53 is described below in Table 54.

TABLE 54

| Element | Description | Required | Multiplicity | Data Type |
|---|---|---|---|---|
| EventID | Event ID. | Required | 1 | String(32) |
| EventName | Event name. | Required | 1 | String |
| EventDescription | Description for the event. | Required | 1 | String |

TABLE 54-continued

| Element | Description | Required | Multiplicity | Data Type |
|---|---|---|---|---|
| EventDetails | Event Details. | Required | 1 | String |
| EventSource | The source that generates the event. | Required | 1 | String |
| EventDateTime | Timestamp when event occurs. | Required | 1 | DateTime | e. Request for Service Account History

Figure 16:
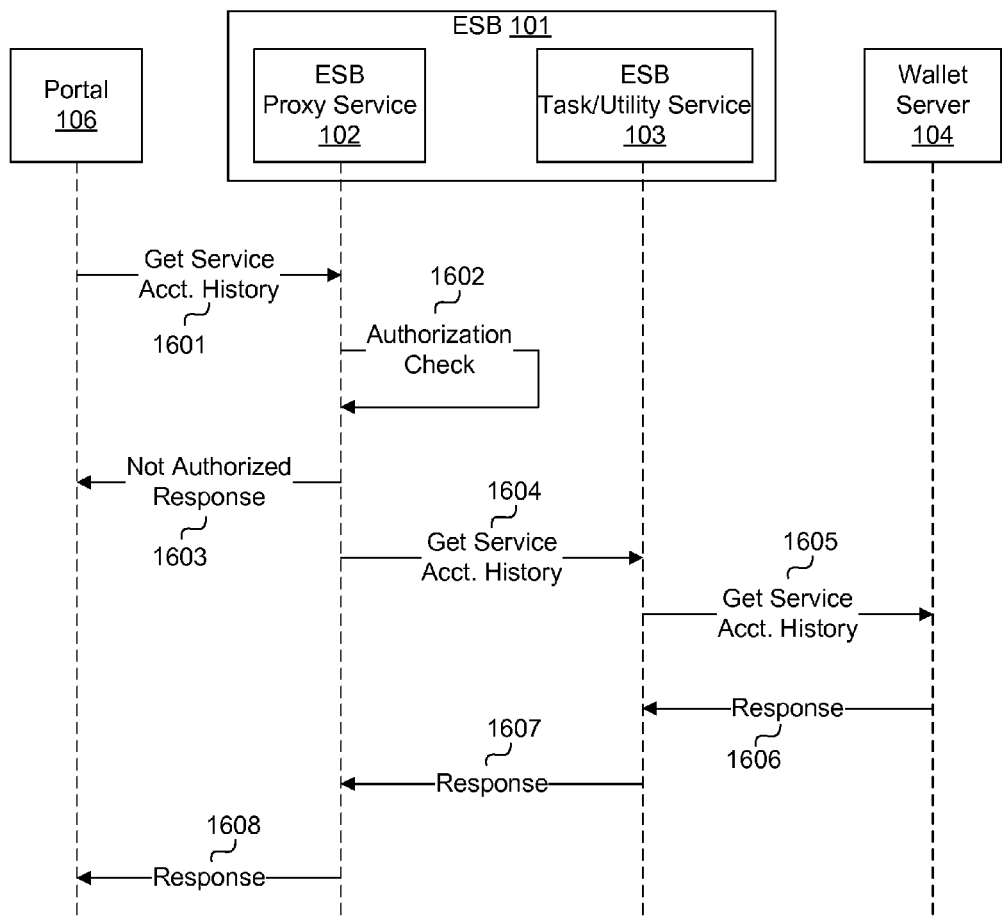
FIG. 16 shows an example procedure for processing a request for service account history relating to a mobile wallet, in accordance with an example embodiment herein.

FIG. 16 shows an example procedure 1600 for processing a request for service account history relating to a mobile wallet, in accordance with an example embodiment herein. In one example embodiment, procedure 1600 enables a partner system, such as elements 106 and/or 108 of FIG. 1 (which may be operated by an agent), to retrieve from the wallet server 104 service account history information associated with a mobile wallet.

At step 1601, the portal 106 transmits to the ESB proxy service 102 a request message (e.g., a get service account history message), including, for example, the data elements described below in Table 55.

TABLE 55

| Element | Description | Required | Multiplicity | Data Type |
|---|---|---|---|---|
| GetServiceAccountHistoryRequest | A root element for the request message which is used by GetServiceAccountHistory operation. | Required | 1 | Container |
| MobileDeviceNumber | Unique consumer identifier. | Required | 1 | String |
| StartFrom | Index to specify from where to get history event. | Required | 1 | Integer |
| Size | Size of history event to be returned. | Required | 1 | Integer |

At step 1602, the ESB proxy service 102 executes an authorization procedure for the request, in the manner described above in connection with FIG. 11.

If authorization of the request is denied at step 1602, then at step 1603, the ESB proxy service 102 communicates a message (e.g., a not authorized response message) to the portal 106 to indicate that authorization of the request is denied.

If, on the other hand, authorization of the request is granted at step 1602, then at step 1604, the ESB proxy service 102 communicates a message (e.g., a get service account history message) to the ESB task service 103.

At step 1605, the ESB task service 103 communicates the message (e.g., the get service account history message) to the wallet server 104 to request wallet event history information relating to a particular mobile wallet.

At step 1606, the wallet server 104 communicates a response to the ESB task service 103, which in turn communicates the response to the ESB proxy service 102 (step 1607). The ESB proxy service 102 in turn communicates the response to the portal 106 (step 1608). An example set of data elements that may be included in the response is described below in Table 56.

TABLE 56

| Element | Description | Required | Multiplicity | Data Type |
|---|---|---|---|---|
| Response | This sub-element specifies the structure for generic ESB response. | Required | 1 | Generic Response Type |
| TotalCount | The total count of ServiceAccountEvent History records. | Optional | 1 | Integer |
| StartIndex | Where to start the records. | Optional | 1 | Integer |
| EndIndex | Where to end the records. | Optional | 1 | Integer |
| ServiceAccountEventHistory | List of service account event history. | Optional | 0 to 100 | Service Account Event History Type |

An example set of data elements that may be included in the ServiceAccountEvent element shown in Table 56 is described below in Table 57.

TABLE 57

| Element | Description | Required | Multiplicity | Data Type |
|---|---|---|---|---|
| ServiceAccountRefNbr | A unique number provided by the service provider to uniquely identify a service account. | Optional | 1 | String 100 |
| EventID | Event ID. | Required | 1 | String 32 |
| EventName | Event name. | Required | 1 | String |
| EventDescription | Description for the event. | Required | 1 | String |
| EventDetails | Event Details, Data associated with event shall also be presented here. | Required | 1 | String |
| EventSource | The source that generates the event. | Required | 1 | String |
| EventDateTime | Timestamp when event occurs. | Required | 1 | DateTime | f. Request for Service Account Event Status

Figure 17:
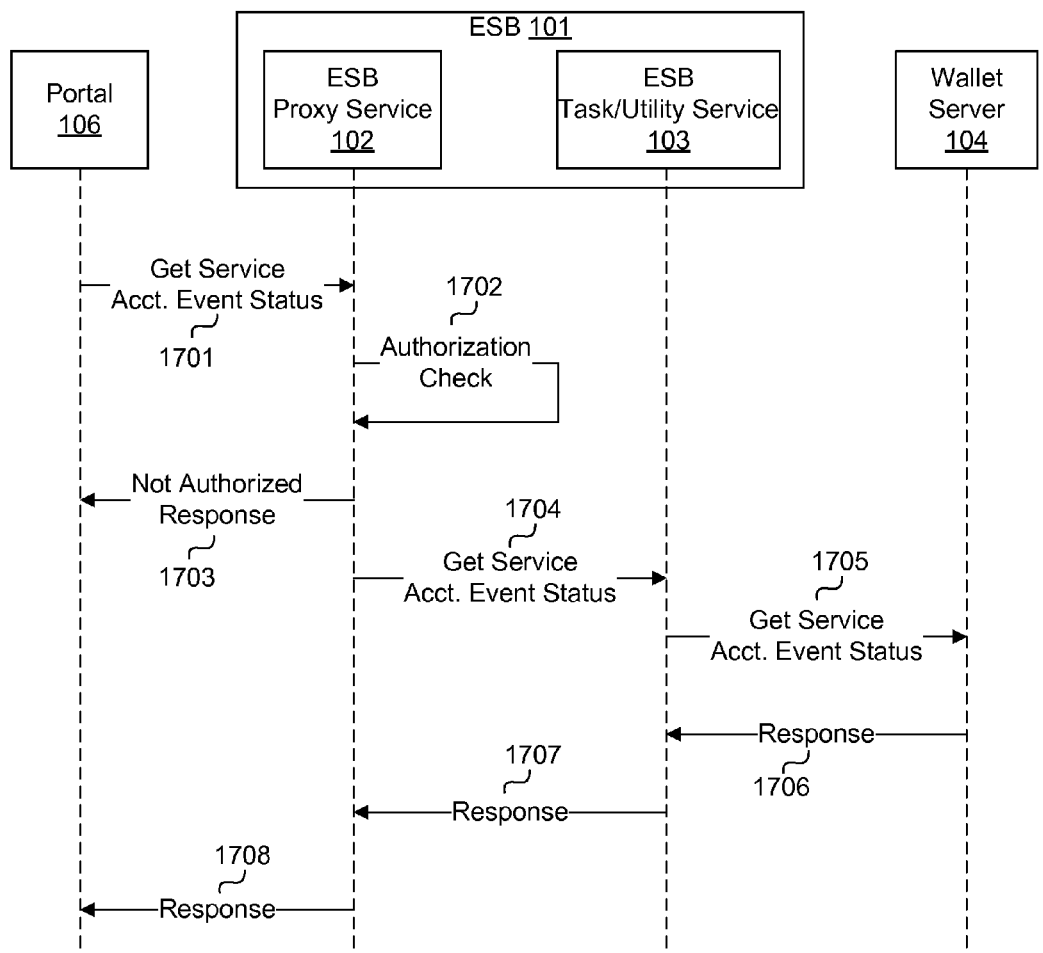
FIG. 17 shows an example procedure for processing a request for service account event status relating to a mobile wallet, in accordance with an example embodiment herein.

FIG. 17 shows an example procedure 1700 for processing a request for service account event status relating to a mobile wallet, in accordance with an example embodiment herein. During the lifecycle of a service account, there are various events for a service account, for instance, the provision of the service account. In one example embodiment, procedure 1700 enables a partner system, such as elements 106 and/or 108 of FIG. 1 (which may be operated by an agent), to retrieve from the wallet server 104 service account event status information relating to a mobile wallet service account.

At step 1701, the portal 106 transmits to the ESB proxy service 102 a request message (e.g., a get service account event status message), including, for example, the data elements described below in Table 58.

TABLE 58

| Element | Description | Required | Multiplicity | Data Type |
|---|---|---|---|---|
| GetServiceAccountEventStatusRequest | A root element for the request message which is used by GetServiceAccount EventStatus operation. | Required | 1 | Container |
| MobileDeviceNumber | Unique consumer identifier. | Required | 1 | String |

At step 1702, the ESB proxy service 102 executes an authorization procedure for the request, in the manner described above in connection with FIG. 11.

If authorization of the request is denied at step 1702, then at step 1703, the ESB proxy service 102 communicates a message (e.g., a not authorized response message) to the portal 106 to indicate that authorization of the request is denied.

If, on the other hand, authorization of the request is granted at step 1702, then at step 1704, the ESB proxy service 102 communicates a message (e.g., a get service account event status message) to the ESB task service 103.

At step 1705, the ESB task service 103 communicates the message (e.g., the get service account event status message) to the wallet server 104 to request wallet event history information relating to a particular mobile wallet.

At step 1706, the wallet server communicates a response to the ESB task service 103, which communicates the response to the ESB proxy service 102 (step 1707), which communicates the response to the portal 106 (step 1708). An example set of data elements that may be included in the response is described below in Table 59.

TABLE 59

| Element | Description | Required | Multiplicity | Data Type |
|---|---|---|---|---|
| Response | This sub-element specifies the structure for generic ESB response. | Required | 1 | Container |
| ServiceAccountEventStatus | Service Account event status. | Optional | 0 to 25 | Container |

An example set of data elements that may be included in the ServiceAccountEventStatus element shown in Table 59 is described below in Table 60.

TABLE 60

| Element | Description | Required | Multiplicity | Data Type |
|---|---|---|---|---|
| Name | Name. | Required | 1 | String |
| Status | Unique identifier for the status of the event of a service account with a specific provider. | Required | 1 | String |
| ErrorMessage | Error Message in the event. | Optional | 1 | String |
| EventDateTime | Time that the event occurs. | Required | 1 | DateTime |

TABLE 60-continued

| Element | Description | Required | Multiplicity | Data Type |
|---|---|---|---|---|
| ServiceAccountRefNr | A reference number provided by the service provider to identify the payment | Optional | 1 | String 100 |

TABLE 60-continued

| Element | Description | Required | Multiplicity | Data Type |
|---|---|---|---|---|
| | account used in the transaction. | | | | g. Request for Update to Service Account State

Figure 18:
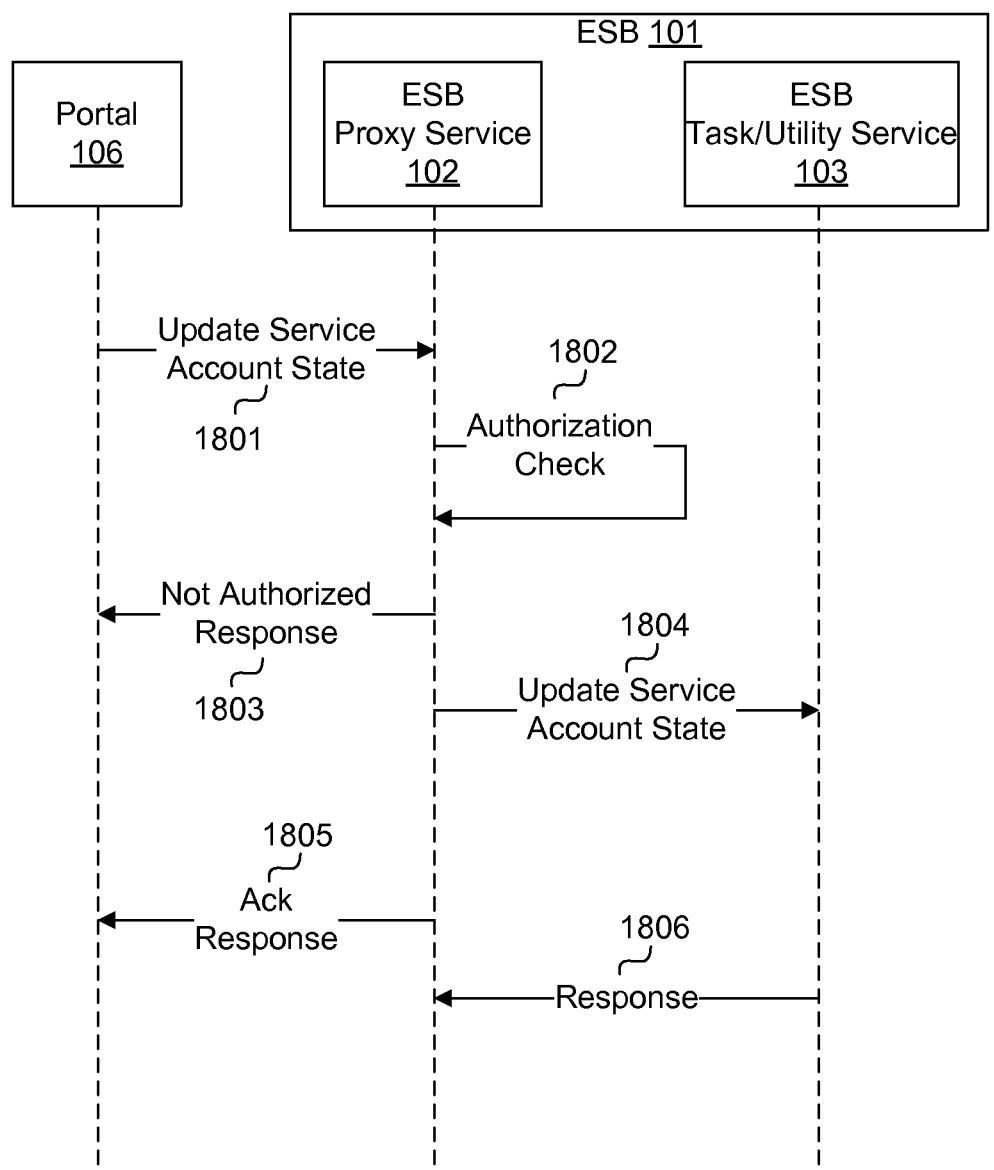
FIG. 18 shows an example procedure for processing a request to update a service account state, in accordance with an example embodiment herein.

FIG. 18 shows an example procedure for processing a request to update a service account state, in accordance with an example embodiment herein. In one example embodiment, procedure 1800 enables a partner system, such as elements 106 and/or 108 of FIG. 1 (which may be operated by an agent), to request that a service account state associated with a mobile wallet be updated. At step 1801, the portal 106 transmits to the ESB proxy service 102 a request message (e.g., an update service account message), including, for example, the data elements described below in Table 61.

TABLE 61

| Element | Description | Required | Multiplicity | Data Type |
|---|---|---|---|---|
| UpdateServiceAccountStateRequest | A root element for the request message which is used by UpdateServiceAccountState operation. | Required | 1 | Container |
| MobileDeviceNumber | Unique consumer identifier. | Required | 1 | String |
| ServiceAccountRefNbr | Service Account Reference Number. | Required | 1 | String |
| ServiceAccountState | Service Account State. | Required | 1 | String |

At step 1801, the portal 106 transmits to the ESB proxy service 102 a request message (e.g., an update service account state message), including, for example, the data elements described below in Table 62.

TABLE 62

| Element | Description | Required | Multiplicity | Data Type |
|---|---|---|---|---|
| UpdateServiceAccountStateRequest | A root element for the request message which is used by UpdateServiceAccountState operation. | Required | 1 | Container |
| MobileDeviceNumber | Unique consumer identifier. | Required | 1 | String |
| ServiceAccountRefNbr | Service Account Reference Number. | Required | 1 | String |
| ServiceAccountState | Service Account State. | Required | 1 | String |

At step 1802, the ESB proxy service 102 executes an authorization procedure for the request, in the manner described above in connection with FIG. 11.

If authorization of the request is denied at step 1802, then at step 1803, the ESB proxy service 102 communicates a message (e.g., a not authorized response message) to the portal 106 to indicate that authorization of the request is denied.

If, on the other hand, authorization of the request is granted at step 1802, then at step 1804, the ESB proxy service 102 communicates a message (e.g., an update service account state message) to the ESB task service 103.

At step 1805, the ESB proxy service 102 communicates an acknowledge message to the portal 106 to confirm that the service account state is being updated.

At step 1806, the ESB task service 103 communicates a response to the ESB proxy service 102, which confirms that the service account state has been updated.

As can be appreciated in view of the above, the systems, methods, and computer program products presented herein for processing a request relating to a mobile communication device enable the safeguarding of information relating to mobile communication devices and the restriction of access to operations relating to mobile communication devices, while also providing consumer care systems and/or agents with a level of access to such information and/or operations that is sufficient for consumer care purposes.

Example aspects described herein also facilitate the processing of mobile wallet information and/or operation requests that are received from different entities (e.g., a mobile wallet provider, external partners, such as payment product issuers and/or mobile network operators (MNOs), and/or the like) and/or personnel that may provide consumer care in connection with mobile wallets. Different levels of access are provided for specific levels of personnel (e.g., consumer care agents) within a particular entity, in accordance with various example aspects herein.

IV. Example Computer-readable Medium Implementations

The example embodiments described above, such as the systems and procedures depicted in or discussed in connection with FIGS. 1 through 18 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented as machine operations. Useful machines for performing the operation of the example embodiments presented herein include general-purpose digital computers or similar devices.

Figure 19:
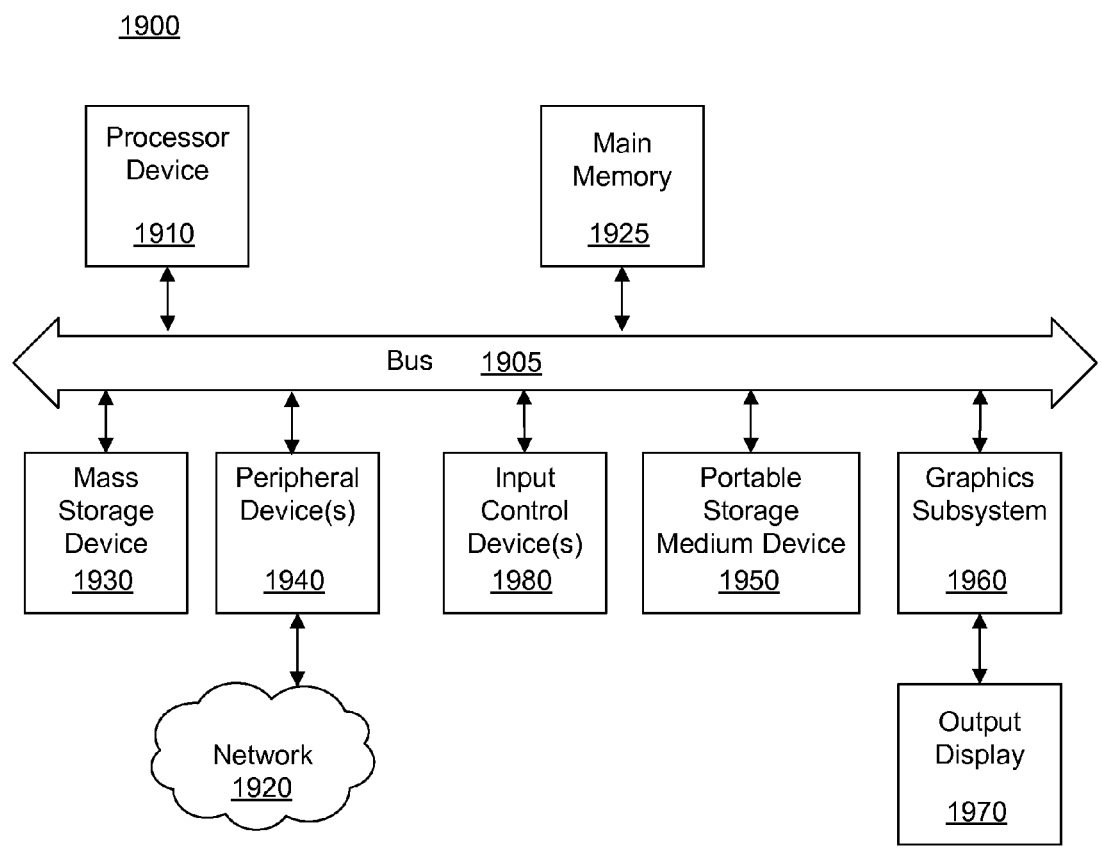
FIG. 19 is a block diagram of a general and/or special purpose computer that may be employed in accordance with various example embodiments herein.

FIG. 19 is a block diagram of a general and/or special purpose computer 1900 that may be employed in accordance with various example embodiments herein. The computer 1900 may be, for example, a user device, a user computer, a client computer, and/or a server computer, among other things.

The computer 1900 may include without limitation a processor device 1910, a main memory 1925, and an interconnect bus 1905. The processor device 1910 may include without limitation a single microprocessor, or may include a plurality of microprocessors for configuring the computer 1900 as a multi-processor system. The main memory 1925 stores, among other things, instructions and/or data for execution by the processor device 1910. The main memory 1925 may include banks of dynamic random access memory (DRAM), as well as cache memory.

The computer 1900 may further include a mass storage device 1930, peripheral device(s) 1940, portable storage medium device(s) 1950, input control device(s) 1980, a graphics subsystem 1960, and/or an output display 1970. For explanatory purposes, all components in the computer 1900 are shown in FIG. 19 as being coupled via the bus 1905. However, the computer 1900 is not so limited. Devices of the computer 1900 may be coupled via one or more data transport means. For example, the processor device 1910 and/or the main memory 1925 may be coupled via a local microprocessor bus. The mass storage device 1930, peripheral device(s) 1940, portable storage medium device(s) 1950, and/or graphics subsystem 1960 may be coupled via one or more input/output (I/O) buses. The mass storage device 1930 may be a nonvolatile storage device for storing data and/or instructions for use by the processor device 1910. The mass storage device 1930 may be implemented, for example, with a magnetic disk drive or an optical disk drive. In a software embodiment, the mass storage device 1930 is configured for loading contents of the mass storage device 1930 into the main memory 1925.

The portable storage medium device 1950 operates in conjunction with a nonvolatile portable storage medium, such as, for example, a compact disc read only memory (CD-ROM), to input and output data and code to and from the computer 1900. In some embodiments, the software for storing an internal identifier in metadata may be stored on a portable storage medium, and may be inputted into the computer 1900 via the portable storage medium device 1950. The peripheral device(s) 1940 may include any type of computer support device, such as, for example, an input/output (I/O) interface configured to add additional functionality to the computer 1900. For example, the peripheral device(s) 1940 may include a network interface card for interfacing the computer 1900 with a network 1920.

The input control device(s) 1980 provide a portion of the user interface for a user of the computer 1900. The input control device(s) 1980 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 1900 may include the graphics subsystem 1960 and the output display 1970. The output display 1970 may include a cathode ray tube (CRT) display and/or a liquid crystal display (LCD). The graphics subsystem 1960 receives textual and graphical information, and processes the information for output to the output display 1970.

Each component of the computer 1900 may represent a broad category of a computer component of a general and/or special purpose computer. Components of the computer 1900 are not limited to the specific implementations provided here.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further includes software for performing example aspects of the invention, as described above.

Included in the programming and/or software of the general and/or special purpose computer or microprocessor are software modules for implementing the procedures described above.

As can be appreciated in view of the foregoing description, the example aspects herein provide a system, method, and computer-readable medium for managing access control that enable access rules to be updated and enforced in an efficient manner that improves both the user's experience and the utilization of computing resources (e.g., the utilization of processor power, processor time, memory, communication channels, and the like).

Unlike existing approaches to managing access control, which employ an inefficient polling scheme whereby, for example, a refresh tag associated with access rules is periodically polled, irrespective of whether any updates have been made to the access rules, in accordance with the example aspects described herein, updates to access rules are retrieved only upon the rules having been updated.

Also, the example aspects described herein, unlike existing approaches, avoid the need to poll the refresh tag upon receiving a request for information and/or an action protected by the access rules. The user's experience is thus improved since the granting of the request need not be delayed until after both the polling of the refresh tag and the updating of the local access rules have been completed.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method to process requests relating to mobile devices, comprising:
  receiving, from a partner system via a communication network by way of a portal and a gateway, a request including a mobile device identifier, an agent identifier, and a partner system identifier corresponding to the partner system, wherein the portal includes a graphical user interface (GUI) that enables the partner system to generate a predetermined set of requests based on a predetermined access level associated with the partner system and the agent identifier;
  authenticating the partner system at the gateway;
  executing an authorization procedure based on the mobile device identifier and the partner system identifier, wherein the step of executing the authorization procedure includes steps of:
    determining whether a partner system account list, associated with the mobile device identifier, includes the partner system identifier;
    granting authorization of the request, if the partner system account list includes the partner system identifier;
  transmitting, to the partner system via the communication network, a response to the request, based on a result of the executing step.

2. The method of claim 1, wherein the request is a request for consumer data relating to a mobile wallet associated with the mobile device identifier, the consumer data including any one or a combination of:
  a consumer profile,
  wallet information,
  wallet event history,
  service account information,
  service account history, and
  service account event status.

3. The method of claim 1, wherein, if the authorization of the request is granted, the method further comprises steps of:
  retrieving the consumer data from a wallet server; and
  including the consumer data in the response.

4. The method of claim 1, wherein the request is a request for performance of an operation relating to a mobile wallet associated with the mobile device identifier, the operation including any one or a combination of:
  updating a service account state,
  updating a mobile wallet state,
  resetting a password, and
  resetting a security question and answer.

5. The method of claim 4, wherein, if the authorization of the request is granted, the method further comprises a step of performing the operation by transmitting one or more commands to the mobile wallet.

6. A system to process requests relating to mobile devices, comprising:
  a processor; and
  at least one memory accessible by the processor and storing at least one of:
    computer code executable by the computer processor, and
    data used by the computer code,
  wherein the computer code includes:
    a receiving module that:
      receives, from a partner system via a communication network by way of a portal and a gateway, a request including a mobile device identifier, an agent identifier, and a partner system identifier corresponding to the partner system, wherein the portal includes a graphical user interface (GUI) that enables the partner system to generate a predetermined set of requests based on a predetermined access level associated with the partner system and the agent identifier;
      authenticates the partner system at the gateway; and
    an execution module that executes an authorization procedure based on the mobile device identifier and the partner system identifier, wherein the authorization procedure includes:
      determining whether a partner system account list, associated with the mobile device identifier, includes the partner system identifier,
      granting authorization of the request, if the partner system account list includes the partner system identifier, and
    a transmitting module that transmits, to the partner system via the communication network, a response to the request, based on a result of the authorization procedure executed by the executing module.

7. The system of claim 6, wherein the request is a request for consumer data relating to a mobile wallet associated with the mobile device identifier, the consumer data including any one or more combination of:
  a consumer profile,
  wallet information,
  wallet event history,
  service account information,
  service account history, and
  service account event status.

8. The system of claim 7, wherein the computer code further includes:
  a retrieval module that, if the authorization of the request is granted, retrieves the consumer data from a wallet server; and
  an inclusion module that, if the authorization of the request is granted, includes the consumer data in the response.

9. The system of claim 6, wherein the request is a request for performance of an operation relating to a mobile wallet associated with the mobile device identifier, the operation including any one or a combination of:
  updating a service account state,
  updating a mobile wallet state,
  resetting a password, and
  resetting a security question and answer.

10. The system of claim 9, wherein the computer code further includes:

a performance module that, if the authorization of the request is granted, performs the operation by transmitting one or more commands to the mobile wallet.

11. A non-transitory computer-readable medium having stored thereon sequences of instructions that, when executed by a computer processor, cause the computer processor to:

receive, from a partner system via a communication network by way of a portal and a gateway, a request including a mobile device identifier, an agent identifier, and a partner system identifier corresponding to the partner system, wherein the portal includes a graphical user interface (GUI) that enables the partner system to generate a predetermined set of requests based on a predetermined access level associated with the partner system and the agent identifier;

authenticate the partner system at the gateway; and execute an authorization procedure based on the mobile device identifier and the partner system identifier, wherein the authorization procedure includes:

determining whether a partner system account list, associated with the mobile device identifier, includes the partner system identifier, granting authorization of the request, if the partner system account list includes the partner system identifier, and transmit, to the partner system via the communication network, a response to the request, based on a result of the executing of the authentication procedure.

12. The non-transitory computer-readable medium of claim 11, wherein the request is a request for consumer data relating to a mobile device associated with the mobile wallet identifier, the consumer data including any one or a combination of:

a consumer profile,
wallet information,
wallet event history,
service account information,
service account history, and
service account event status.

13. The non-transitory computer-readable medium of claim 12, wherein the sequences of instructions, when executed by the computer processor, further cause the computer processor to:

retrieve the consumer data from a wallet server, if the authorization of the request is granted; and include the consumer data in the response, if the authorization of the request is granted.

14. The non-transitory computer-readable medium of claim 11, wherein the request is a request for performance of an operation relating to a mobile wallet associated with the mobile device identifier, the operation including any one or a combination of:

updating a service account state,
updating a mobile wallet state,
resetting a password, and
resetting a security question and answer.

15. The non-transitory computer-readable medium of claim 14, wherein if the authorization of the request is granted, the sequences of instructions, when executed by the computer processor, further cause the computer processor to perform the operation by transmitting one or more commands to the mobile wallet.

* * * * *